United States Patent
Cho et al.

(10) Patent No.: US 11,580,354 B2
(45) Date of Patent: Feb. 14, 2023

(54) COMPUTING APPARATUS USING CONVOLUTIONAL NEURAL NETWORK AND METHOD OF OPERATING THE SAME

(71) Applicant: SAMSUNG ELECTRONICS CO., LTD., Suwon-si (KR)

(72) Inventors: Insang Cho, Suwon-si (KR); Wonjae Lee, Suwon-si (KR); Chanyoung Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 903 days.

(21) Appl. No.: 16/433,484

(22) Filed: Jun. 6, 2019

(65) Prior Publication Data

US 2020/0082244 A1 Mar. 12, 2020

(30) Foreign Application Priority Data

Sep. 6, 2018 (KR) .................. 10-2018-0106507

(51) Int. Cl.
*G06N 3/04* (2006.01)
*G06K 9/62* (2022.01)
*G06N 3/08* (2006.01)

(52) U.S. Cl.
CPC ............. *G06N 3/04* (2013.01); *G06K 9/6232* (2013.01); *G06K 9/6239* (2013.01); *G06K 9/6256* (2013.01); *G06N 3/08* (2013.01)

(58) Field of Classification Search
CPC .......... G06N 3/04; G06N 3/08; G06N 3/0454; G06N 3/063; G06N 3/082; G06N 3/088;
(Continued)

(56) References Cited

U.S. PATENT DOCUMENTS

2015/0036920 A1 2/2015 Wu et al.
2016/0196672 A1 7/2016 Chertok et al.
(Continued)

FOREIGN PATENT DOCUMENTS

EP 3 319 015 A1 5/2018
EP 3349153 A1 7/2018
(Continued)

OTHER PUBLICATIONS

Du et al., "A Reconfigurable Streaming Deep Convolutional Neural Network Accelerator for Internet of Things," in IEEE Transactions on Circuits and Systems I: Regular Papers, vol. 65, No. 1, pp. 198-208, Jan. 2018, doi: 10.1109/TCSI.2017.2735490 (Year: 2018).*
(Continued)

*Primary Examiner* — Boubacar Abdou Tchoussou
(74) *Attorney, Agent, or Firm* — Sughrue Mion, PLLC

(57) ABSTRACT

An apparatus and a method use a convolutional neural network (CNN) including a plurality of convolution layers in the field of artificial intelligence (AI) systems and applications thereof. A computing apparatus using a CNN including a plurality of convolution layers includes a memory storing one or more instructions; and one or more processors configured to execute the one or more instructions stored in the memory to obtain input data; identify a filter for performing a convolution operation with respect to the input data, on one of the plurality of convolution layers; identify a plurality of sub-filters corresponding to different filtering regions within the filter; provide a plurality of feature maps based on the plurality of sub-filters; and obtain output data, based on the plurality of feature maps.

15 Claims, 18 Drawing Sheets

(58) Field of Classification Search
CPC .. G06K 9/6232; G06K 9/6239; G06K 9/6256; G06K 9/6273; G06V 10/454; G06V 10/82
See application file for complete search history.

(56) References Cited

U.S. PATENT DOCUMENTS

| | | |
|---|---|---|
| 2017/0103299 A1 | 4/2017 | Aydonat et al. |
| 2018/0137406 A1 | 5/2018 | Howard et al. |
| 2018/0157933 A1 | 6/2018 | Brauer et al. |
| 2019/0108618 A1* | 4/2019 | Hwang ................ G06T 3/4015 |
| 2019/0294413 A1* | 9/2019 | Vantrease ............. G06F 7/5095 |

FOREIGN PATENT DOCUMENTS

| | | |
|---|---|---|
| WO | 2017183034 A1 | 10/2017 |
| WO | 2017200883 A1 | 11/2017 |
| WO | 2017214970 A1 | 12/2017 |

OTHER PUBLICATIONS

Li Du et al., "A Reconfigurable Streaming Deep Convolutional Neural Network Accelerator for Internet of Things", IEEE, Jul. 8, 2018, XP055569293. (10 pages total).
Communication dated Jul. 12, 2021 by the European Patent Office in European Application No. 19857215.8.
International Search Report and Written Opinion (PCT/ISA/210 and PCT/ISA/237), dated Sep. 11, 2019 by International Searching Authority in International Application No. PCT/KR2019/006723.
Communication dated Mar. 22, 2022 issued by the European Patent Office in EP Application No. 19857215.8.

* cited by examiner

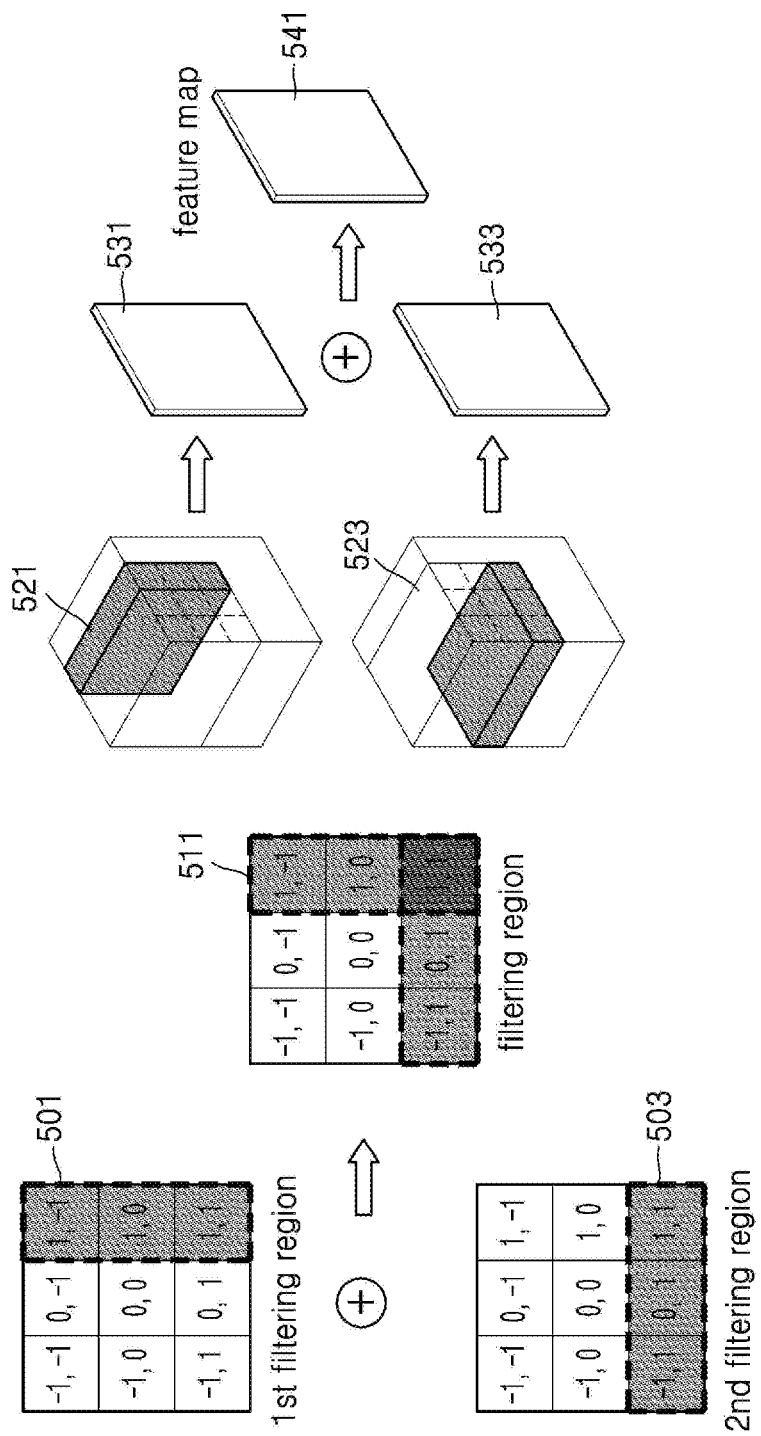

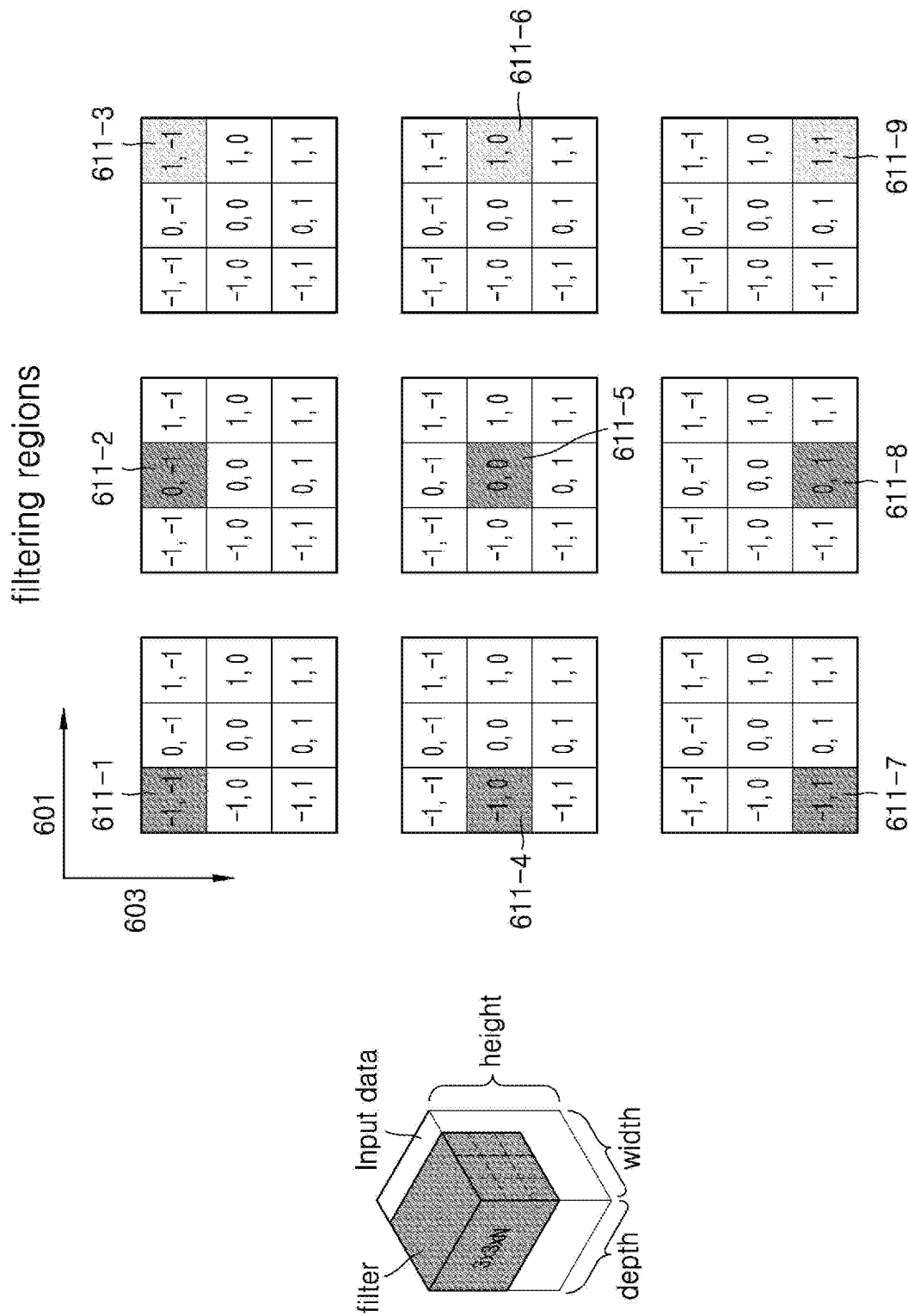

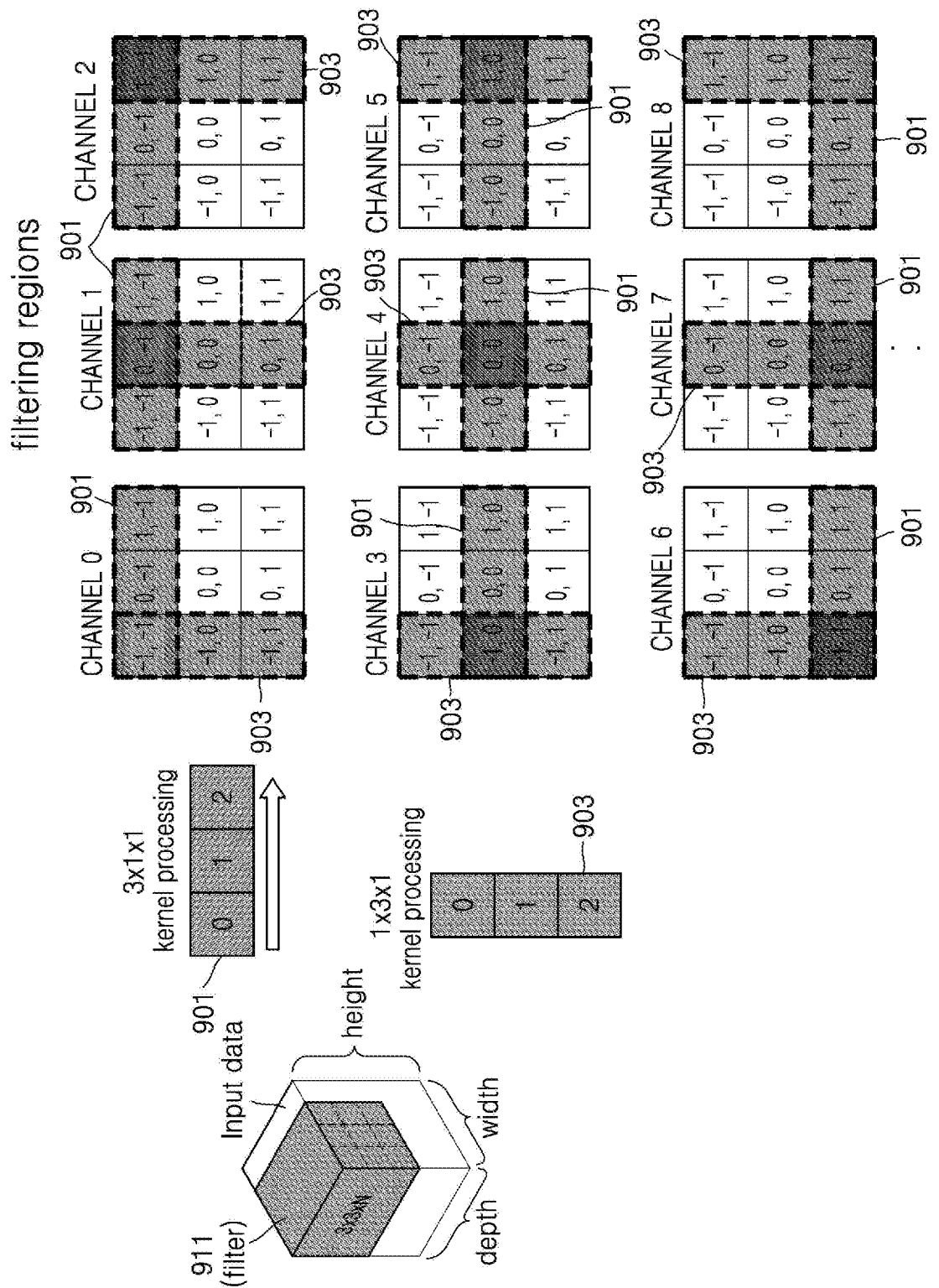

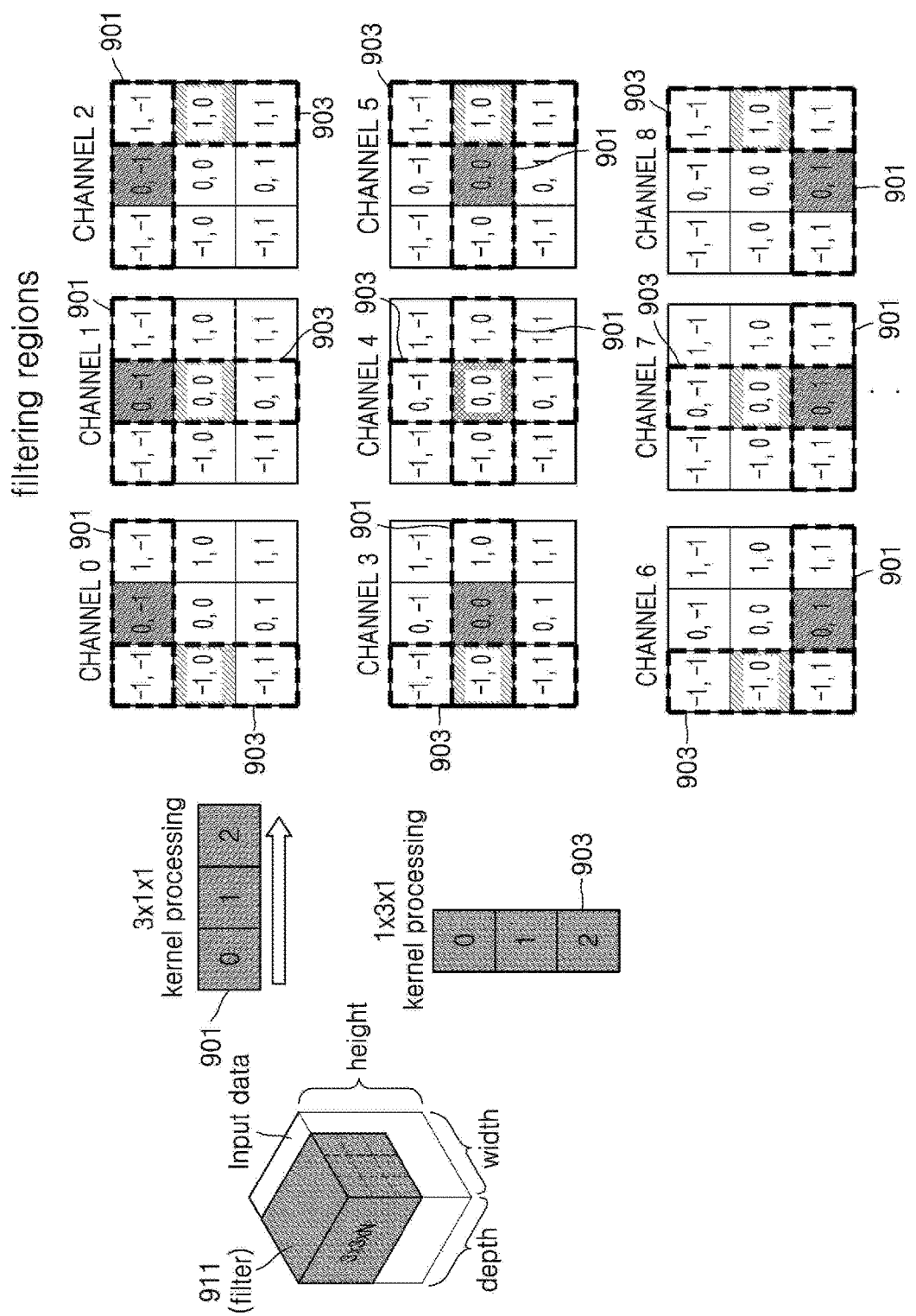

COMPUTING APPARATUS USING CONVOLUTIONAL NEURAL NETWORK AND METHOD OF OPERATING THE SAME

CROSS-REFERENCE TO RELATED APPLICATION(S)

This application is based on and claims priority under 35 U.S.C. § 119 to Korean Patent Application No. 10-2018-0106507, filed on Sep. 6, 2018, in the Korean Intellectual Property Office, the disclosure of which is incorporated by reference herein in its entirety.

BACKGROUND

1. Field

The disclosure relates to apparatuses using a convolutional network and methods of operating the same, and more particularly, to an apparatus using a neural network for increasing operation efficiency of artificial intelligence (AI) systems, and a method of operating the apparatus.

2. Description of Related Art

Artificial intelligence (AI) systems are computer systems configured to realize human-level intelligence and train themselves and make determinations spontaneously to become smarter, in contrast to existing rule-based smart systems. Because recognition rates of AI systems improve and the AI systems more accurately understand a user's preferences the more they are used, existing rule-based smart systems are being gradually replaced by deep-learning AI systems.

AI technology includes machine learning (deep learning) and element technologies employing the machine learning. Machine learning is an algorithm technology that self-classifies/learns the characteristics of input data, and each of the element technologies is a technology of mimicking functions of human brains, such as perception and determination, by using a machine learning algorithm, such as deep learning, and includes technical fields, such as linguistic understanding, visual understanding, deduction/prediction, knowledge representation, and operation control.

SUMMARY

Provided is a way of more quickly obtaining output data by efficiently selecting a filter that is used in a convolution operation within a convolutional neural network (CNN).

Provided is a way of deriving an effect corresponding to a pruning effect by performing an operation by using a partial region of a filter that is used in a convolution operation within a CNN.

Additional aspects will be set forth in part in the description which follows and, in part, will be apparent from the description, or may be learned by practice of the presented embodiments of the disclosure.

According to an embodiment of the disclosure, a computing apparatus is provided using a convolutional neural network (CNN) including a plurality of convolution layers, the computing apparatus including: a memory storing one or more instructions; and one or more processors configured to execute the one or more instructions stored in the memory to: obtain input data; identify a filter for performing, on one of the plurality of convolution layers, a convolution operation with respect to the input data; identify a plurality of sub-filters within the filter, the plurality of sub-filters associated with a plurality of filtering regions, wherein each of the plurality of filtering regions is associated with at least one of the plurality of sub-filters; provide a plurality of feature maps based on the plurality of sub-filters; and obtain output data based on the plurality of feature maps.

In some embodiments, the one or more processors are further configured to execute the one or more instructions to identify the plurality of sub-filters by: identifying a first filtering region and a second filtering region, the second filtering region being different from the first filtering region; and identifying a selected filter associated with the first filtering region and associated with the second filtering region as one of the plurality of sub-filters.

In some embodiments, the one or more processors are further configured to execute the one or more instructions to provide the plurality of feature maps by: providing a first feature map by performing a first convolution operation with respect to the input data by using a first filter associated with the first filtering region; providing a second feature map by performing a second convolution operation with respect to the input data by using a second filter associated with the second filtering region; and providing a third feature map of the plurality of feature maps by performing summation with respect to the first and second feature maps.

In some embodiments, the one or more processors are further configured to execute the one or more instructions to identify the plurality of sub-filters by: identifying a first filtering region of a predetermined size associated with the filter; and identifying a plurality of filtering regions by shifting an association of the first filtering region in each of a first direction and a second direction with respect to the filter.

In some embodiments, the one or more processors are further configured to execute the one or more instructions to provide the plurality of feature maps by: identifying, as one of the plurality of feature maps, a first feature map provided by performing a convolution operation with respect to the input data, by using a first filter associated with the first filtering region; providing a second feature map by shifting the first feature map in a first direction; and providing a third feature map by shifting the first feature map in a second direction.

In some embodiments, the input data comprises three-dimensional (3D) matrix data having a size of $a \times b \times n$, wherein a, b, and n are natural numbers.

In some embodiments, the input data corresponds to a group of a plurality of pieces of two-dimensional (2D) matrix data, and the plurality of sub-filters are applied to the plurality of pieces of 2D matrix data, and the plurality of sub-filters are associated with different 2D filtering regions.

In some embodiments, the one or more processors are further configured to execute the one or more instructions to train the plurality of sub-filters using predetermined input data and predetermined output data.

In some embodiments, the one or more processors are further configured to execute the one or more instructions to train a first sub-filter of the plurality of sub-filters by identifying a weight of the first sub-filter and identifying a filtering region associated the first sub-filter.

In some embodiments, the output data comprises image data corresponding to the input data.

Also provided by the disclosure is a method of operating a CNN including a plurality of convolution layers, the method including: obtaining input data; identifying a filter for performing, on one of the plurality of convolution layers, a convolution operation with respect to the input data;

identifying a plurality of sub-filters within the filter, the plurality of sub-filters associated with a plurality of filtering regions, wherein each of the plurality of filtering regions is associated with at least one of the plurality of sub-filters; providing a plurality of feature maps based on the plurality of sub-filters; and obtaining output data based on the plurality of feature maps.

In some embodiments of the disclosure, a computer program product is provided including one or more computer-readable storage media having stored thereon a program, which, when executed by a computer, performs an operations including: obtaining input data; identifying a filter for performing, on one of a plurality of convolution layers, a convolution operation with respect to the input data; identifying a plurality of sub-filters within the filter, the plurality of sub-filters associated with a plurality of filtering regions, wherein each of the plurality of filtering regions is associated with at least one of the plurality of sub-filters; providing a plurality of feature maps based on the plurality of sub-filters; and obtaining output data based on the plurality of feature maps.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 5 illustrates an example of performing an operation by using a filtering region being a partial region of a filter, according to an embodiment of the disclosure;

FIG. 6A illustrates an example of determining a plurality of sub-filters having different filtering regions;

FIG. 9A illustrates examples of determining a plurality of sub-filters having different filtering regions;

FIG. 9B illustrates examples of determining a plurality of sub-filters having different filtering regions;

DETAILED DESCRIPTION

Figure 1:
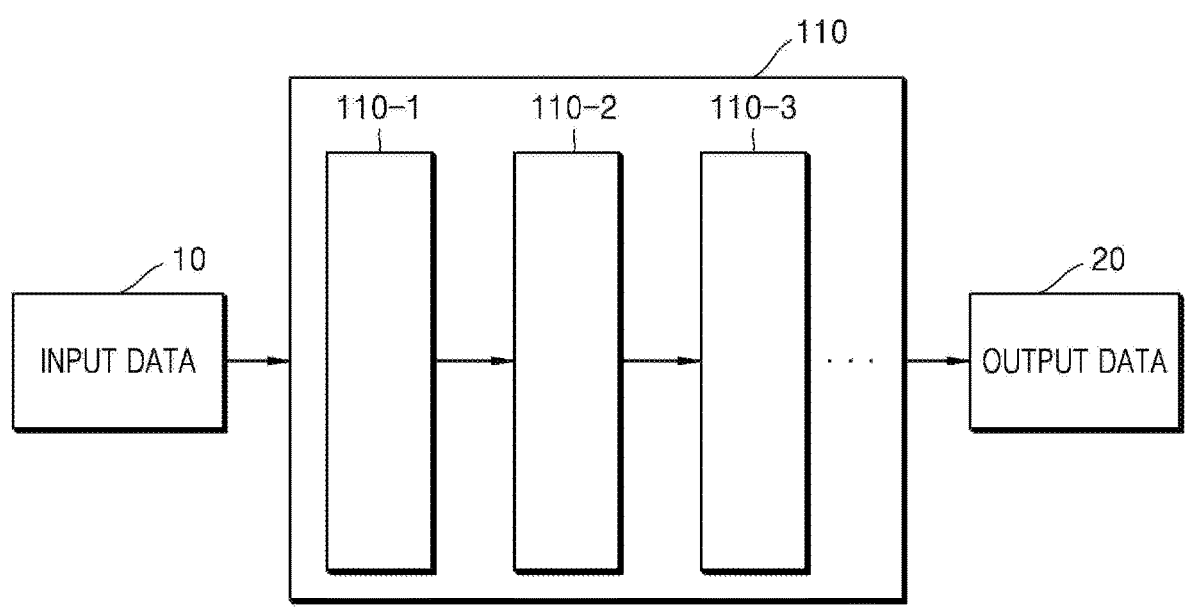
FIG. 1 is a block diagram for explaining a convolutional neural network (CNN) according to an embodiment of the disclosure.

Throughout the disclosure, the expression "at least one of a, b or c" indicates only a, only b, only c, both a and b, both a and c, both b and c, all of a, b, and c, or variations thereof.

Embodiments of the disclosure are described in detail herein with reference to the accompanying drawings so that this disclosure may be easily performed by one of ordinary skill in the art to which the disclosure pertain. The disclosure may, however, be embodied in many different forms and should not be construed as being limited to the embodiments set forth herein. In the drawings, parts irrelevant to the description are omitted for simplicity of explanation, and like numbers refer to like elements throughout.

Although general terms widely used at present were selected for describing the disclosure in consideration of the functions thereof, these general terms may vary according to intentions of one of ordinary skill in the art, case precedents, the advent of new technologies, and the like. Hence, the terms must be defined based on their meanings and the contents of the entire specification, not by simply stating the terms.

The terms used in the disclosure are merely used to describe particular embodiments of the disclosure, and are not intended to limit the scope of the disclosure. An expression used in the singular encompasses the expression of the plural, unless it has a clearly different meaning in the context. Throughout the specification, when an element is referred to as being "connected" or "coupled" to another element, it can be directly connected or coupled to the other element, or can be electrically connected or coupled to the other element with intervening elements interposed therebetween. In addition, the terms "comprises" and/or "comprising" or "includes" and/or "including" when used in this disclosure, specify the presence of stated elements, but do not preclude the presence or addition of one or more other elements.

The use of the terms "a" and "an" and "the" and similar referents in the context of describing the disclosure (especially in the context of the following claims) are to be construed to cover both the singular and the plural. Also, the steps of all methods described herein can be performed in any suitable order unless otherwise indicated herein or otherwise clearly contradicted by context. Embodiments of the disclosure are not limited to the described order of the operations.

Thus, the expression "according to an embodiment" used in the entire disclosure does not necessarily indicate the same embodiment of the disclosure.

The aforementioned embodiments of the disclosure may be described in terms of functional block components and various processing steps. Some or all of such functional blocks may be realized by any number of hardware and/or software components configured to perform the specified functions. For example, functional blocks according to the disclosure may be realized by one or more microprocessors or by circuit components for a predetermined function. In addition, for example, functional blocks according to the disclosure may be implemented with any programming or scripting language. The functional blocks may be implemented in algorithms that are executed on one or more processors. Furthermore, the disclosure described herein could employ any number of techniques according to the related art for electronics configuration, signal processing and/or control, data processing and the like. The words "mechanism," "element," "means," and "configuration" are used broadly and are not limited to mechanical or physical embodiments of the disclosure.

Furthermore, the connecting lines or connectors between components shown in the various figures presented are intended to represent exemplary functional relationships and/or physical or logical couplings between the components. Connections between components may be represented by many alternative or additional functional relationships, physical connections or logical connections in a practical device.

The disclosure will now be described more fully with reference to the accompanying drawings, in which exemplary embodiments of the disclosure are shown.

FIG. 1 is a block diagram for explaining a convolutional neural network (CNN) according to an embodiment of the disclosure.

Deep learning based on a neural network is used in various fields. A CNN 110, which is a deep neural network technique, has been being actively used as recent technology for image processing. The CNN 110 includes a plurality of convolution layers 110-1, 110-2, and 110-3. Each convolution layer receives M input feature maps and generates N output feature maps (where M and N are natural numbers).

A convolution layer included in the CNN 110 performs a convolution operation by using a filter with a predetermined size. A convolution operation used in the CNN 110 may decrease complexity and unnecessary connections, compared with a fully connecting method.

An operation that occupies a greatest calculation amount when the CNN 110 is driven is convolution. A convolution operation in which multiplication and accumulation are repeated consumes greater power than other operations. Thus, a technique capable of reducing a calculation amount required for a convolution operation is needed to construct hardware for driving the CNN 110.

Figure 2:
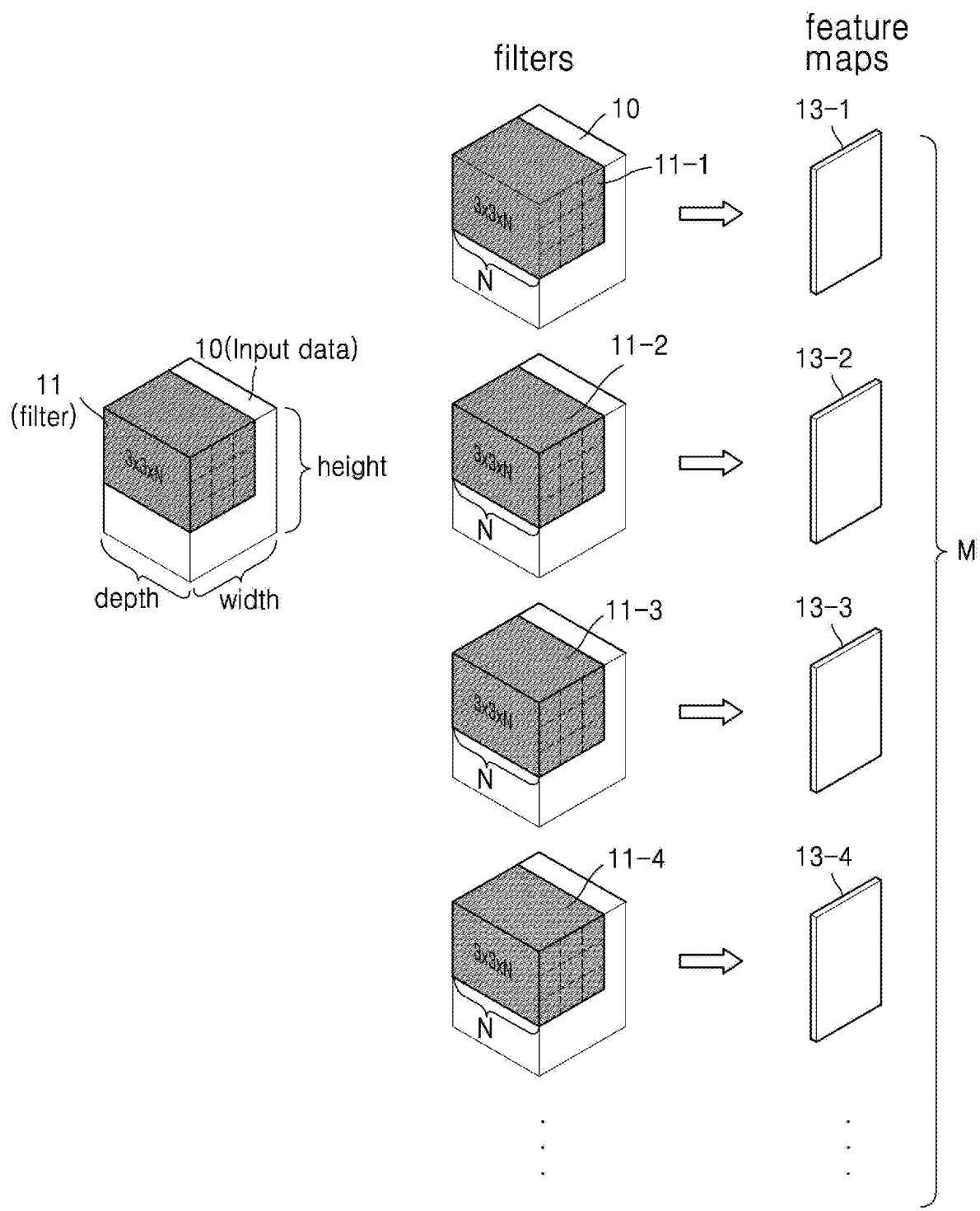
FIG. 2 is a schematic view for explaining a calculation that is performed in a convolution layer of a CNN according to an embodiment of the disclosure.

FIG. 2 is a schematic view for explaining a calculation that is performed in a convolution layer of a CNN according to an embodiment of the disclosure.

Input data 10 in a convolution layer may be two-dimensional (2D) or three-dimensional (3D) data having a certain size. A size of the input data 10 may be determined by a width, a height, and a depth. For example, the input data 10 may include 3D matrix data having a size of a×b×n (where a, b, and n are natural numbers). The input data 10 may correspond to a feature map. When input data is a feature map, a depth of the input data may correspond to the number of feature maps.

A feature map may be obtained by performing a convolution operation using a filter 11 with a size of 3×3×N with respect to the input data 10, wherein N is a natural number and may correspond to a depth value of the input data 10.

While the filter 11 is being moved in a width direction and a height direction within the input data 10, the convolution operation is performed on the input data 10. A region including a weight value that is used in a convolution operation together with the input data 10 within the filter 11 is referred to as a filtering region. Referring to FIG. 2, because the entire region of the filter 11 with a size of 3×3×N is a region including a weight value that is used in a convolution operation with the input data 10, the filtering region is 3×3×N. When a convolution operation is performed with respect to the input data 10 by using a 3×3×N-sized filtering region of the filter 11 with a size of 3×3×N, 3×3×N multiplications are needed to calculate one value within a feature map.

A plurality of feature maps, namely, first, second, third, and fourth feature maps 13-1, 13-2, 13-3, and 13-4, may be obtained by performing a convolution operation using each of a plurality of filters, namely, first, second, third, and fourth filters 11-1, 11-2, 11-3, and 11-4, with respect to the input data 10. The first, second, third, and fourth filters 11-1, 11-2, 11-3, and 11-4 may be filters including different weight values.

Referring to FIG. 2, the first feature map 13-1 may be obtained by performing a convolution operation using the first filter 11-1 with a size of 3×3×N with respect to the input data 10. The second feature map 13-2 may be obtained by performing a convolution operation using the second filter 11-2 with a size of 3×3×N with respect to the input data 10. The third feature map 13-3 may be obtained by performing a convolution operation using the third filter 11-3 with a size of 3×3×N with respect to the input data 10. The fourth feature map 13-4 may be obtained by performing a convolution operation using the fourth filter 11-4 with a size of 3×3×N with respect to the input data 10.

When a convolution operation is performed with respect to the input data 10 by using M filters, M feature maps may be obtained.

Figure 3:
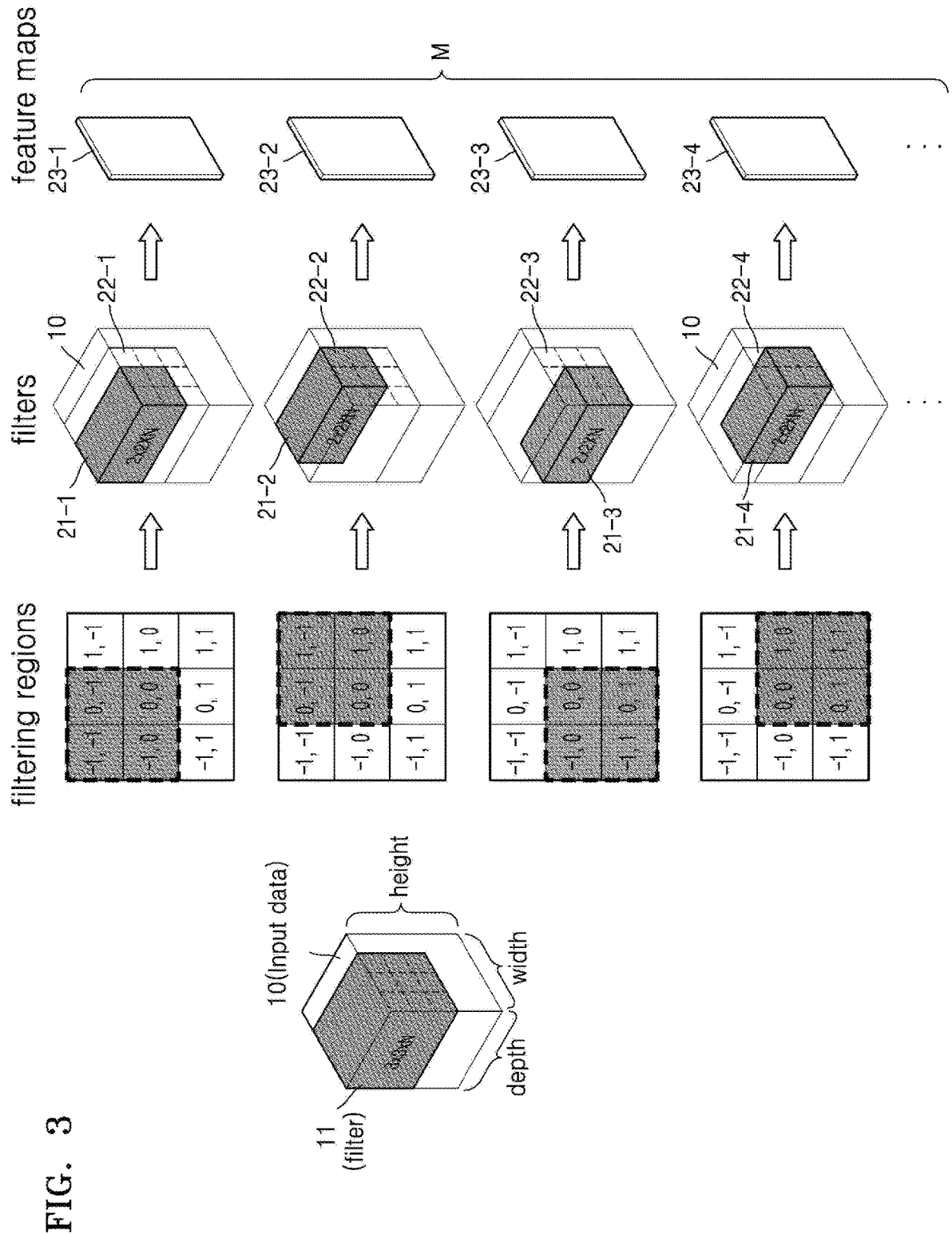
FIG. 3 is a schematic view for explaining a calculation that is performed in a convolution layer of a CNN according to an embodiment of the disclosure.

FIG. 3 is a schematic view for explaining a calculation that is performed in a convolution layer of a CNN according to an embodiment of the disclosure.

Referring to FIG. 3, similar to the description given above with reference to FIG. 2, a feature map may be obtained for the input data 10 by using the filter 11 with a size of 3×3×N, where N is a natural number and may correspond to a depth value of the input data 10.

Referring to FIG. 3, a filtering region being a region including a weight value that is used in a convolution operation together with the input data 10 within the filter 11 may have a size of 2×2×N. For convenience of explanation, the filtering region is illustrated as a 2D figure representing only a height and a width. Weight values included in a remaining region other than the filtering region within the filter 11 are not used in a convolution operation.

When a convolution operation is performed with respect to the 2×2×N-sized filtering region within the input data 10 by using the filter of a size of 3×3×N, 2×2×N multiplications are needed to calculate one value within a feature map. When an operation is performed using a filtering region being a partial region of the filter 11, the calculation amount may be reduced, compared with when a convolutional operation is performed on a filtering region with the same size as that of the filter 11.

According to an embodiment of the disclosure, a plurality of feature maps, namely, first, second, third, and fourth feature maps 23-1, 23-2, 23-3, and 23-4, may be obtained by performing a convolution operation with respect to the input data 10 by using a plurality of sub-filters, namely, first, second, third, and fourth sub-filters 22-1, 22-2, 22-3, and 22-4. The first, second, third, and fourth sub-filters 22-1, 22-2, 22-3, and 22-4 may be a plurality of filters corresponding to different filtering regions 21-1, 21-2, 21-3, and 21-4 within the filter 11. Generally, the sub-filter 22-1 is associated with the filtering region 21-1 of FIG. 3. Similarly, the sub-filter 22-2 is associated with the filtering region 21-2, the sub-filter 22-3 is associated with the filtering region 21-3, and the sub-filter 22-4 is associated with the filtering region 21-4.

Referring to FIG. 3, the first feature map 23-1 may be obtained by performing a convolution operation using the first sub-filter 22-1 with a size of 3×3×N with respect to the input data 10. The second feature map 23-2 may be obtained by performing a convolution operation using the second sub-filter 22-2 with a size of 3×3×N with respect to the input data 10. The third feature map 23-3 may be obtained by performing a convolution operation using the third sub-filter 22-3 with a size of 3×3×N with respect to the input data 10. The fourth feature map 23-4 may be obtained by performing a convolution operation using the fourth sub-filter 22-4 with a size of 3×3×N with respect to the input data 10.

When an operation is performed by using a 2×2×N-sized filtering region within a filter with a size of 3×3×N, the amount of calculation may be reduced about 55%, compared with when a 3×3×N-sized filtering region within the filter of a size of 3×3×N is entirely used, and thus output data may be more quickly obtained.

Instead of performing four convolution operations on the input data 10 by using each of the first, second, third, and fourth sub-filters 22-1, 22-2, 22-3, and 22-4, a feature map obtained by performing a convolution operation by using a 2×2×N-sized filter within the input data 10 may be shifted in a direction corresponding to the different filtering regions 21-1, 21-2, 21-3, and 21-4 within the filter 11. In some embodiments, the sub-filter 22-1 may then be associated with the different filtering regions 21-1, 21-2, 21-3, and 21-4 of FIG. 3.

When output data is obtained or data is learned by using a CNN, result data of an improved quality may be obtained when using the different filtering regions 21-1, 21-2, 21-3, and 21-4 within the filter 11, compared with when using a single filtering region. By obtaining data by using some filtering regions of the filter 11 with respect to the input data 10, the amount of calculation may be reduced, and obtained result data may have an improved quality. The convolution operation method described with reference to FIG. 3 may be applied to the image processing field being a field that requires a large number of calculations to obtain output data for the input data 10 or learn data.

According to an embodiment of the disclosure, a CNN performing a convolution operation by using some filtering regions is applicable to processing of changing the style of an image to a style of a film, such as a style transfer.

The different filtering regions 21-1, 21-2, 21-3, and 21-4 shown in FIG. 3 are an example, and according to embodiments of the disclosure, various types of filtering regions may be used.

Figure 4:
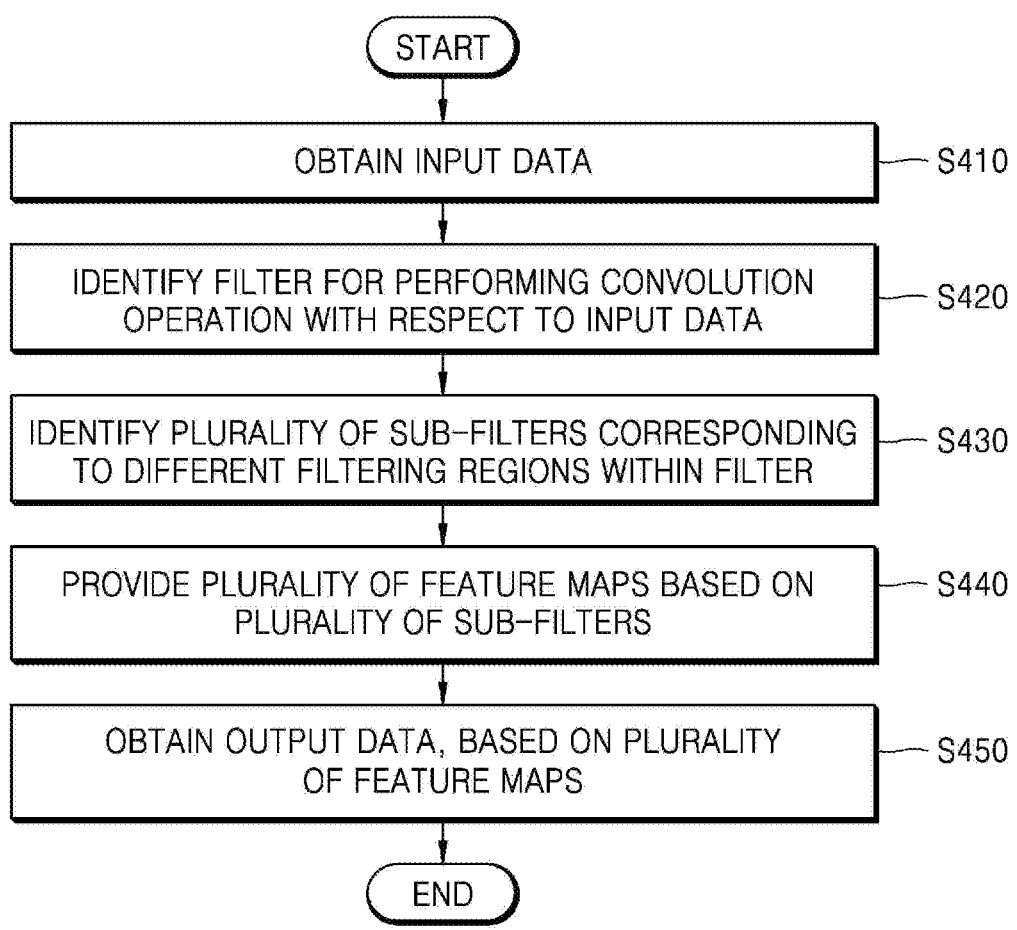
FIG. 4 is a flowchart of a method of operating a CNN, according to an embodiment of the disclosure.

FIG. 4 is a flowchart of a method of operating a CNN, according to an embodiment of the disclosure.

The method of operating the CNN may be performed by an electronic device 1000 to be described later with reference to FIG. 10.

In operation S410, an electronic device according to an embodiment of the disclosure may obtain input data.

In operation S420, the electronic device according to an embodiment of the disclosure may determine a filter for performing a convolution operation with respect to the input data, from one of a plurality of convolution layers. In some embodiments, the input data refers to one of the plurality of convolution layers.

In operation S430, the electronic device according to an embodiment of the disclosure may determine a plurality of sub-filters corresponding to different filtering regions within the filter.

In operation S440, the electronic device according to an embodiment of the disclosure may generate a plurality of feature maps based on the plurality of sub-filters.

In operation S450, the electronic device according to an embodiment of the disclosure may obtain output data, based on the plurality of feature maps. In some embodiments, the output data is obtained by summing elements from two different feature maps.

An embodiment of determining a plurality of sub-filters corresponding to different filtering regions within a filter and generating a plurality of feature maps based on the plurality of sub-filters will now be described in detail.

FIG. 5 illustrates an example of performing an operation by using a filtering region being a partial region of a filter according to an embodiment of the disclosure.

According to an embodiment of the disclosure, a filtering region 511 including a first filtering region 501 and a second filtering region 503 different from the first filtering region 501 may be determined within a predetermined filter.

According to an embodiment of the disclosure, the filter including the first filtering region 501 and the second filtering region 503 as the filtering region 511 may be determined as one of a plurality of sub-filters that are applied to input data.

Referring to FIG. 5, a first feature map 531 may be generated by applying a first filter 521 including the first filtering region 501 to the input data, and a second feature map 533 may be generated by applying a second filter 523 including the second filtering region 503 to the input data. A single feature map 541 may be generated by performing summation on the first feature map 531 and the second feature map 533. In some embodiments, weight values at a given height and width of the filter 11 may be commonly associated to the first filtering region 511 and the second filtering region 503. See in FIG. 5 for example, width and height position marked 1,1 and the corresponding overlap of the first filter 521 and the second filter 523.

FIG. 6A illustrates an example of determining a plurality of sub-filters having different filtering regions.

Referring to FIG. 6A, a size of a filtering region within a filter with a 3×3×N size may be 1×1×N. According to an embodiment of the disclosure, a first filtering region 611-1 with a size of 1×1×N may be determined. A plurality of filtering regions, namely, first through ninth filtering regions 611-1, 611-2, 611-3, 611-4, 611-5, 611-6, 611-7, 611-8, and 611-9, may be determined by shifting the first filtering region 611-1 in a first direction 601 and a second direction 603 within the filter. Thus, in this embodiment, the plurality of filtering regions are of the same size as the first filtering region 611-1. The first direction 601 and the second direction 603 may correspond to a width direction and a height direction of input data, respectively.

Referring to FIG. 6A, the nine first through ninth filtering regions 611-1, 611-2, 611-3, 611-4, 611-5, 611-6, 611-7, 611-8, and 611-9 within the filter with a size of 3×3×N may have 1×1×N sizes.

Figure 6B:
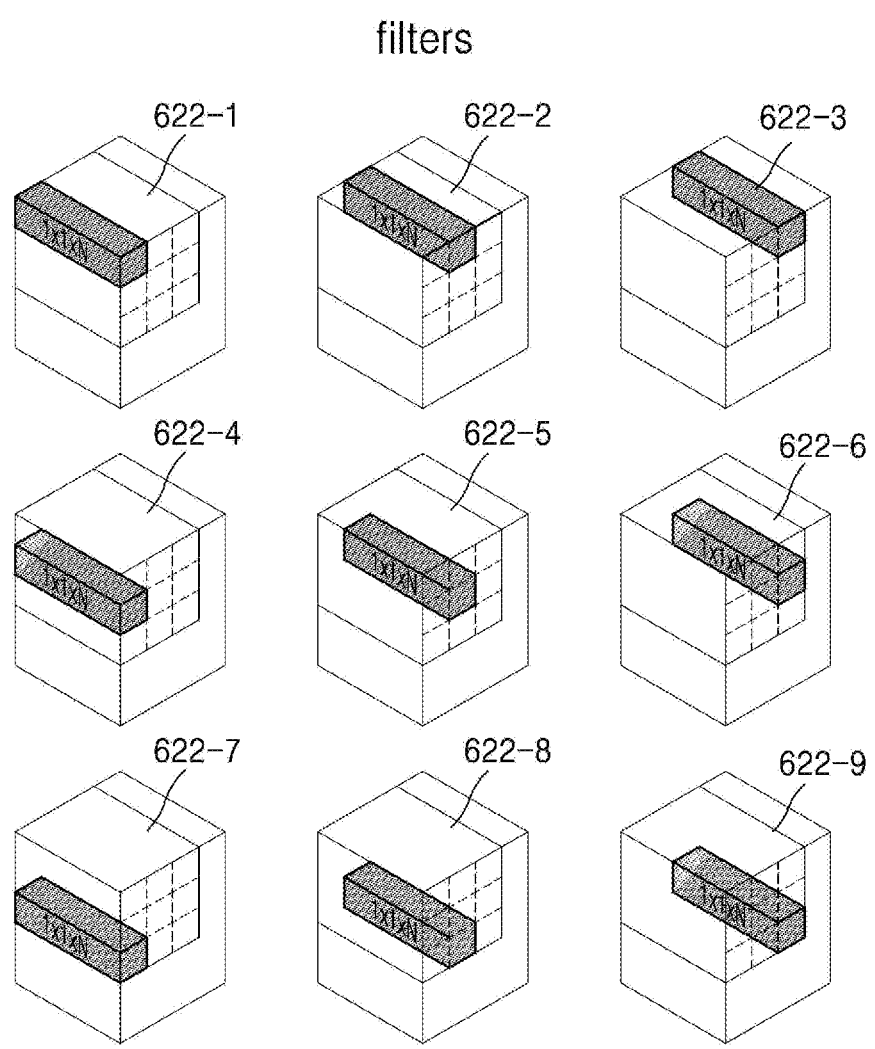
FIG. 6B illustrates an example of determining a plurality of sub-filters having different filtering regions.

FIG. 6B also illustrates an example of determining a plurality of sub-filters having different filtering regions.

Referring to FIG. 6B, a plurality of sub-filters 622-1, 622-2, 622-3, 622-4, 622-5, 622-6, 622-7, 622-8, and 622-9 corresponding to the first through ninth filtering regions 611-1, 611-2, 611-3, 611-4, 611-5, 611-6, 611-7, 611-8, and 611-9 of FIG. 6A may be determined.

A plurality of feature maps (not shown) for the input data may be obtained using the plurality of sub-filters 622-1, 622-2, 622-3, 622-4, 622-5, 622-6, 622-7, 622-8, and 622-9, respectively.

According to an embodiment of the disclosure, when the first through ninth filtering regions 611-1, 611-2, 611-3, 611-4, 611-5, 611-6, 611-7, 611-8, and 611-9 within the filter have the same weights, a feature map may be generated using a filter with a 1×1×N size including only the first filtering region 611-1, and a plurality of feature maps for the plurality of sub-filters 622-1, 622-2, 622-3, 622-4, 622-5, 622-6, 622-7, 622-8, and 622-9 may be obtained by shifting the generated feature map in each of the first and second directions 601 and 603.

According to an embodiment of the disclosure, filtering regions of a plurality of sub-filters included in a single convolution layer may have different sizes. At least one of a filtering region or a size of the filtering region may be determined by learning in a neural network.

Figure 7A:
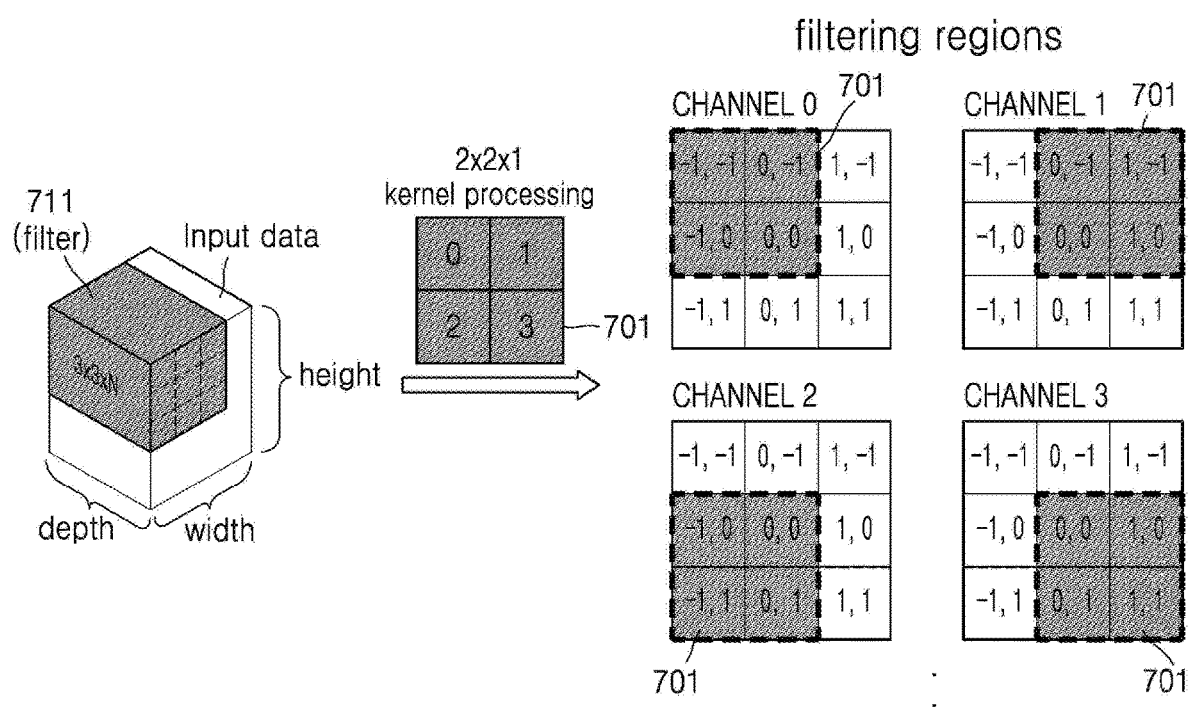
FIG. 7A illustrates an example of determining a plurality of sub-filters having different filtering regions.
Figure 7B:
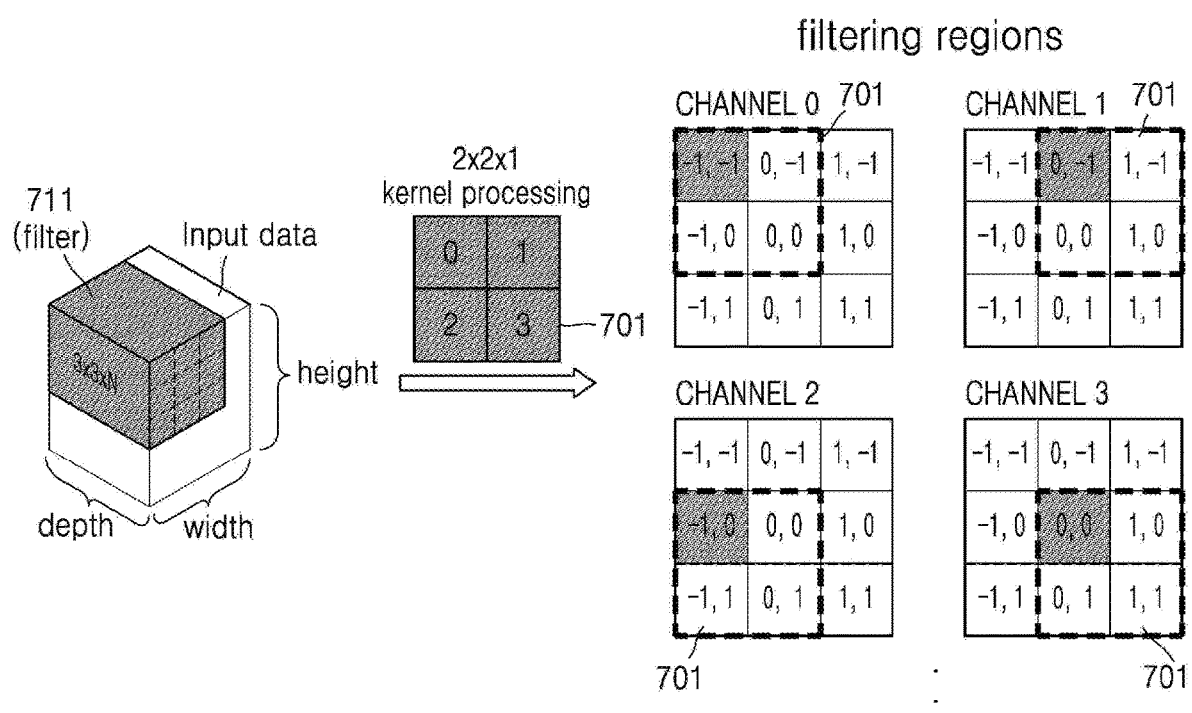
FIG. 7B illustrates an example of determining a plurality of sub-filters having different filtering regions.

FIG. 7A illustrates an example of determining a plurality of sub-filters having different filtering regions. FIG. 7B also illustrates an example of determining a plurality of sub-filters having different filtering regions.

Referring to FIGS. 7A and 7B, according to an embodiment of the disclosure, a size of a filter 711 may be 3×3×N, and a size of a filtering region of the filter 711 may be 2×2×N. FIGS. 7A and 7B illustrate a kernel 701 with a 2×2×1 size for representing a filtering region to which the filter 711 is applied, within the filter 711.

Referring to FIGS. 7A and 7B, a filtering region to which the filter 711 is applied for each channel within the filter 711 is illustrated. The filter 711 having a size of 3×3×N may include different filtering regions for different channels. The channels may correspond to depths of the input data.

According to the embodiment of FIG. 7A of the disclosure, filtering regions may be determined by shifting a location of the kernel 701 within the filter 711 with a size of 3×3×N for each channel.

According to the embodiment of FIG. 7B of the disclosure, filtering regions may be determined by shifting a location of the kernel 701 within the filter 711 with a size of 3×3×N for each channel. The filtering regions may be determined as partial regions within the kernel 701 that is shifted for each channel. For example, referring to FIG. 7B, a region corresponding to a region represented as 0 within the kernel 701 may be determined as a filtering region.

Although channels 0, 1, 2, and 3 are illustrated in FIGS. 7A and 7B, the number of channels is not limited thereto.

Figure 8A:
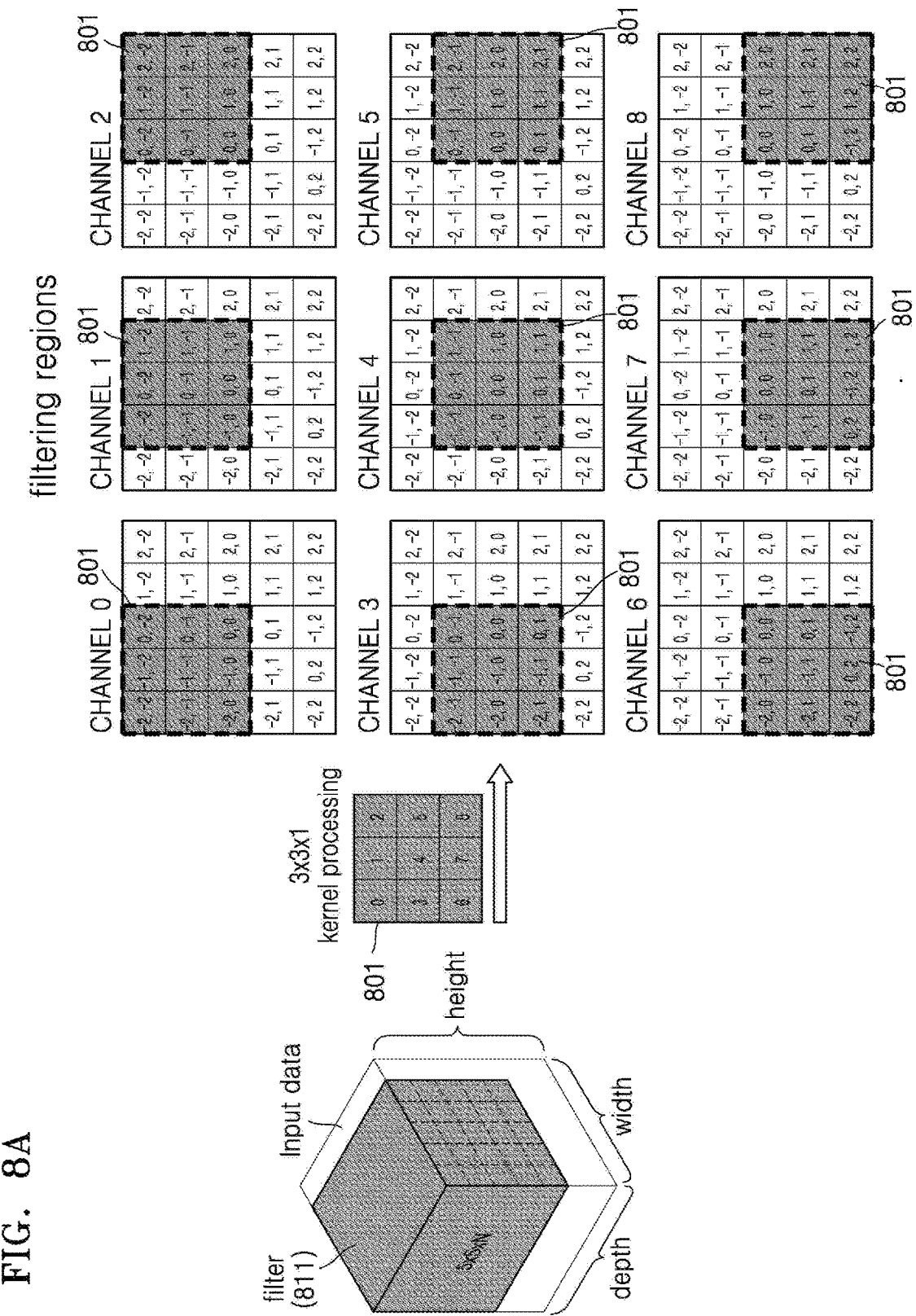
FIG. 8A illustrates an example of determining a plurality of sub-filters having different filtering regions.
Figure 8B:
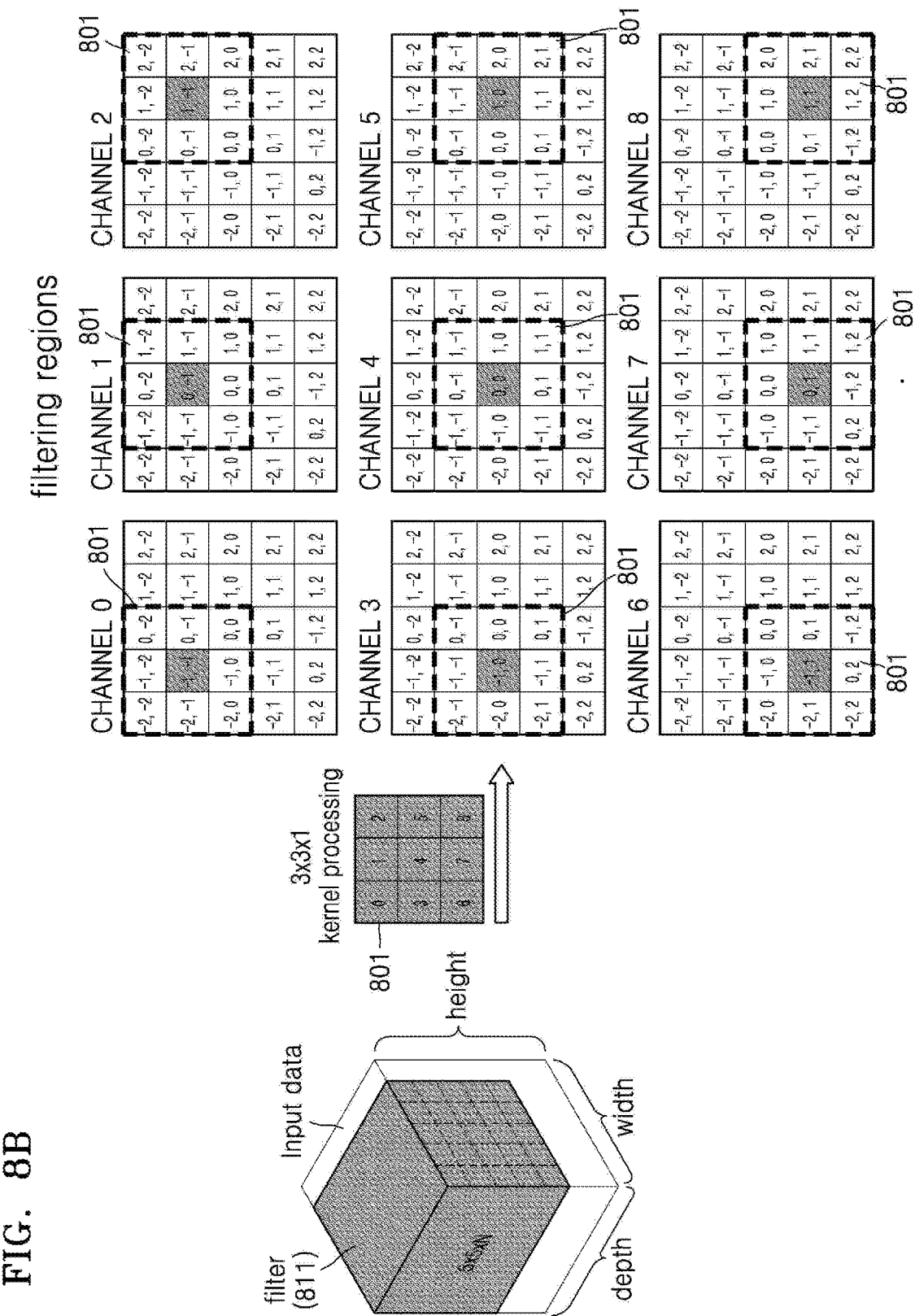
FIG. 8B illustrates an example of determining a plurality of sub-filters having different filtering regions.

FIG. 8A illustrates an example of determining a plurality of sub-filters having different filtering regions. FIG. 8B also illustrates an example of determining a plurality of sub-filters having different filtering regions. Referring to FIGS. 8A and 8B, according to an embodiment of the disclosure, a size of a filter 811 may be 5×5×N, and a size of a filtering region of the filter 811 may be 3×3×N. FIGS. 8A and 8B illustrate a kernel 801 with a size of 3×3×1 for representing a filtering region to which the filter 811 is applied, within the filter 811.

Referring to FIGS. 8A and 8B, a filtering region to which the filter 811 is applied for each channel within the filter 811 is illustrated. The filter 811 having a size of 5×5×N may include different filtering regions for different channels. The channels may correspond to depths of the input data.

According to the embodiment of FIG. 8A of the disclosure, filtering regions may be determined by shifting a location of the kernel 801 within the filter 811 with a size of 5×5×N for each channel.

According to the embodiment of FIG. 8B of the disclosure, filtering regions may be determined by shifting a location of the kernel 801 for each channel within the fixed kernel 801 within the filter 811 with a size of 5×5×N. The filtering regions may be determined as partial regions within the kernel 801 that is shifted for each channel. For example, referring to FIG. 8B, a region corresponding to a region represented as 4 within the kernel 801 may be determined as a filtering region.

Although channels 0 through 8 are illustrated in FIGS. 8A and 8B, the number of channels is not limited thereto.

FIG. 9A illustrates an example of determining a plurality of sub-filters having different filtering regions. FIG. 9B also illustrates an example of determining a plurality of sub-filters having different filtering regions.

Referring to FIGS. 9A and 9B, according to an embodiment of the disclosure, a size of a filter 911 may be 3×3×N, and a size of a filtering region of the filter 911 may be 3×3×N+1×3×N. FIGS. 9A and 9B illustrate a kernel 901 with a size of 3×1×1 and a kernel 903 with a size of 1×3×1 for representing a filtering region to which the filter 911 is applied, within the filter 911.

Referring to FIGS. 9A and 9B, a filtering region to which the filter 911 is applied for each channel within the filter 911 is illustrated. The filter 911 having a size of 3×3×N may include different filtering regions for different channels. The channels may correspond to depths of the input data.

According to the embodiment of FIG. 9A of the disclosure, filtering regions may be determined by shifting locations of the kernels 901 and 903 within the filter 911 with a size of 3×3×N for each channel.

According to the embodiment of FIG. 9B of the disclosure, filtering regions may be determined by shifting a location of the kernel 901 within the filter 911 with a size of 3×3×N for each channel. The filtering regions may be determined as partial regions within the kernels 901 and 903 that are shifted for each channel. For example, referring to FIG. 9B, a region corresponding to a region represented as 1 within the kernel 901 and a region corresponding to a region represented as 1 within the kernel 903 may be determined as a filtering region.

Although channels 0 through 8 are illustrated in FIGS. 9A and 9B, the number of channels is not limited thereto.

Figure 10:
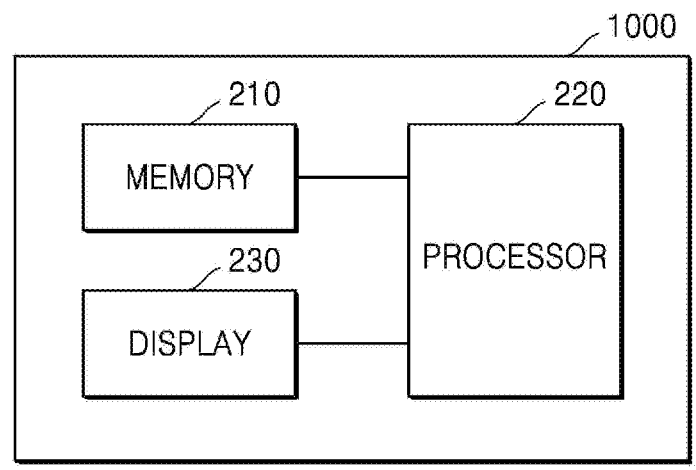
FIG. 10 is a block diagram of a structure of an electronic device according to an embodiment of the disclosure.

FIG. 10 is a block diagram of a structure of an electronic device 1000 according to an embodiment of the disclosure.

The electronic device 1000 may be any device including a CNN including a plurality of convolution layers.

The electronic device 1000 may be realized in various types. Examples of the electronic device 1000 may include, but are not limited to, a mobile phone, a smartphone, a personal computer (PC), a tablet PC, personal digital assistants (PDA), a laptop, a media player, an MP3 player, a portable multimedia player (PMP), a digital camera, a navigation device, a global positioning system (GPS) device, an electronic book terminal, a digital broadcasting terminal, a micro-server, and other mobile or non-mobile computing devices. The electronic device 1000 may also be a watch, glasses, a hair band, or a ring each having a communication function and a data processing function.

Referring to FIG. 10, the electronic device 1000 may include a memory 210, a processor 220, and a display 230. However, the electronic device 1000 may be implemented by more or less components than the components illustrated in FIG. 10.

The memory 210 may store at least one instruction that is executed by the processor 220. For example, the memory 130 may store various pieces of data for driving the electronic device 1000 under the control of the processor 120 and controlling the electronic device 1000, and may also store data that is input to or output from the electronic device 1000. The memory 210 may include a module including one or more instructions.

The processor 220 may execute one or more instructions stored in the memory 210. The processor 220 may include a processor including a single core, a dual core, a triple core, a quad core, or a multiple core thereof. The processor 220 may include a plurality of processors.

The processor 220 may obtain input data. The input data may include various types of data, such as a text, a voice, and an image (i.e., a still image, a moving picture, or a screen shot).

The processor 220 may determine a filter for performing a convolution operation with respect to the input data, from one of the plurality of convolution layers.

The processor 220 may determine a plurality of sub-filters corresponding to different filtering regions within a filter and generate a plurality of feature maps based on the plurality of sub-filters.

The processor 220 may obtain output data, based on the plurality of feature maps. The output data may include various types of data, such as a text, a voice, and an image (i.e., a still image, a moving picture, or a screen shot).

According to an embodiment of the disclosure, when the input data is an image captured by a camera, the output data may be a painting of a certain style into which the image is transformed.

When the processor 220 determines the plurality of sub-filters, the processor 220 may determine a first filtering region and a second filtering region, the second filtering region being different from the first filtering region, within the filter, and determine, as one of the plurality of sub-filters, a filter including the first filtering region and the second filtering region as filtering regions.

The processor 220 may generate a first feature map by performing a convolution operation with respect to the input data by using a first filter determined by the first filtering region.

The processor 220 may generate a second feature map by performing a convolution operation with respect to the input data by using a second filter determined by the second filtering region.

The processor 220 may generate one of the plurality of feature maps by performing summation with respect to the first and second feature maps.

When the processor 220 determines the plurality of sub-filters, the processor 220 may determine a first filtering region with a predetermined size within the filter, determine a plurality of filtering regions obtained by shifting the first filtering region in each of a first direction and a second direction within the filter, and determine the plurality of sub-filters corresponding to the plurality of filtering regions.

The processor 220 may determine, as one of the plurality of feature maps, the first feature map generated by performing a convolution operation with respect to the input data, by using the first filter including the first filtering region. The processor 220 may generate feature maps by shifting the first feature map in each of the first direction and the second direction.

The input data may include 3D matrix data having a size of a×b×n (where a, b, and n are natural numbers).

The input data may correspond to a group of a plurality of pieces of 2D matrix data, and a plurality of filters that are applied to the plurality of pieces of 2D matrix data may be filters including different filtering regions. The plurality of pieces of 2D matrix data may correspond to feature maps.

The processor 220 may train the plurality of sub-filters by using predetermined input data and predetermined output data. The processor 220 may determine a weight of the filter and may determine a filtering region within the filter.

The output data may include image data corresponding to the input data.

Some of the functions performed by the processor 220 may be performed by an external server. According to an embodiment of the disclosure, the processor 220 may output input data received via the external server or output data obtained via the external server to the display 230. The processor 220 may transmit the generated output data to the external server.

The display 230 may also display content (for example, a moving picture or a still image) that is input under the control of the processor 220. The display 230 may output an image stored in the memory 210 under the control of the processor 220.

Figure 11:
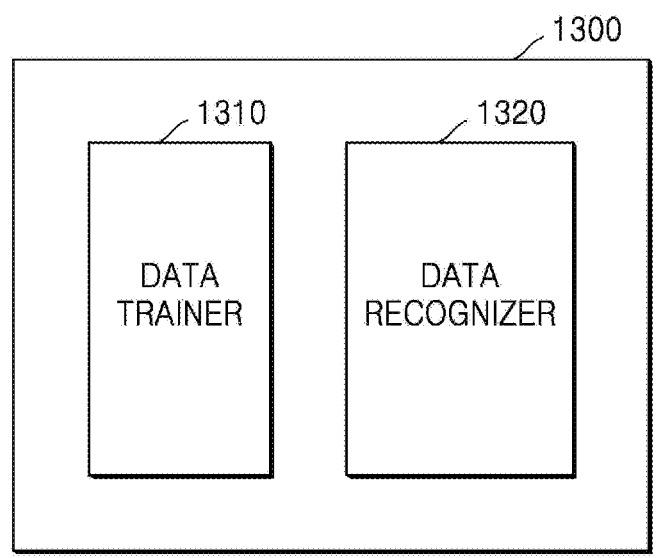
FIG. 11 is a block diagram of a processor according to an embodiment of the disclosure.

FIG. 11 is a block diagram of a processor 1300 according to an embodiment of the disclosure.

Referring to FIG. 11, the processor 1300 may include a data trainer 1310 and a data recognizer 1320.

The data trainer 1310 may train a criterion for obtaining a recognition result. The data trainer 1310 may train a criterion regarding what data is used to determine a certain situation and how to obtain the recognition result by using data. The data trainer 1310 may obtain data that is to be used in training, and may apply the obtained data to a data recognition model which will be described later, thereby training the criterion for obtaining the recognition result.

The data recognizer 1320 may output a recognition result based on data. The data recognizer 1320 may output a recognition result from certain data, by using a trained data recognition model. The data recognizer 1320 may obtain the certain data according to a criterion previously set due to training, and use a data recognition model by using the obtained data as an input value, thereby outputting a certain recognition result based on the certain data. A result value output by the data recognition model by using the obtained data as an input value may be used to refine the data recognition model.

At least one of the data trainer 1310 or the data recognizer 1320 may be manufactured in the form of at least one hardware chip and may be mounted on an electronic device. For example, at least one of the data trainer 1310 or the data recognizer 1320 may be manufactured in the form of a dedicated hardware chip for artificial intelligence (AI), or may be manufactured as a portion of an existing general-purpose processor (for example, a central processing unit (CPU) or an application processor (AP)) or a processor dedicated to graphics (for example, a graphics processing unit (GPU)) and may be mounted on any of the aforementioned various electronic devices.

In this case, the data trainer 1310 and the data recognizer 1320 may be both mounted on a single electronic device, or may be respectively mounted on independent electronic devices. For example, one of the data trainer 1310 and the data recognizer 1320 may be included in an electronic device, and the other may be included in a server. The data trainer 1310 and the data recognizer 1320 may be connected to each other by wire or wirelessly, and thus model information established by the data trainer 1310 may be provided to the data recognizer 1320 and data input to the data recognizer 1320 may be provided as additional training data to the data trainer 1310.

At least one of the data trainer 1310 or the data recognizer 1320 may be implemented as a software module. When at least one of the data trainer 1310 or the data recognizer 1320 is implemented using a software module (or a program module including instructions), the software module may be stored in non-transitory computer readable media. In this case, the at least one software module may be provided by an operating system (OS) or by a certain application. Alternatively, some of the at least one software module may be provided by an OS and the others may be provided by a certain application.

Figure 12:
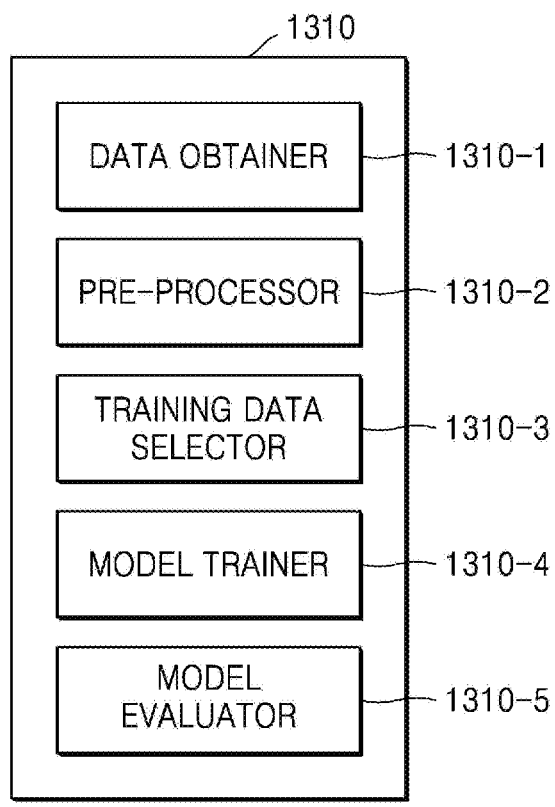
FIG. 12 is a block diagram of a data trainer according to an embodiments of the disclosure.

FIG. 12 is a block diagram of the data trainer 1310 according to an embodiment of the disclosure.

Referring to FIG. 12, the data trainer 1310 may include a data obtainer 1310-1, a pre-processor 1310-2, a training data selector 1310-3, a model trainer 1310-4, and a model evaluator 1310-5.

The data obtainer 1310-1 may obtain data necessary for obtaining a recognition result. The data obtainer 1310-1 may obtain data necessary for training for obtaining the recognition result.

For example, the data obtainer 1310-1 included in the data trainer 1310 that trains an input image and an output image determined according to the input image may receive an image or a moving picture. For example, the data obtainer 1310-1 may receive an image or a moving picture through a camera of an electronic device including the data trainer 1310 or through an external apparatus capable of communicating with the electronic device including the data trainer 1310. The camera may include at least one image sensor (e.g., a front sensor or a rear sensor), a lens, an image signal processor (ISP), or a flash (e.g., a light emitting diode (LED) or a xenon lamp).

The pre-processor 1310-2 may pre-process obtained data such that the obtained data may be used in training for situation determination. The pre-processor 1310-2 may process the obtained data in a preset format such that the model trainer 1310-4, which will be described later, may use the obtained data for training for generating a text comment.

The training data selector 1310-3 may select data necessary for training from among pieces of pre-processed data. The selected data may be provided to the model trainer 1310-4. The training data selector 1310-3 may select the data necessary for training from among the pre-processed data, according to the preset criterion for situation determination. The training data selector 1310-3 may select data according to a criterion previously set due to training by the model trainer 1310-4, which will be described later.

The model trainer 1310-4 may train a criterion regarding how to determine a situation, based on the training data. The model trainer 1310-4 may train a criterion regarding which training data is to be used for situation determination.

The model trainer 1310-4 may train a data recognition model for use in situation determination, by using the training data. In this case, the data recognition model may be a previously established model. For example, the data recognition model may be a model previously established by receiving basic training data (for example, a sample image).

The data recognition model may be established in consideration of, for example, an application field of a recognition model, a purpose of training, or computer performance of a device. The data recognition model may be, for example, a model based on a neural network. For example, a model, such as a deep neural network (DNN), a recurrent neural network (RNN), a bidirectional recurrent DNN (BRDNN), or a CNN may be used as the data recognition model, but the disclosure is not limited thereto.

According to various embodiments of the disclosure, when a plurality of data recognition models that are pre-established exist, the model trainer 1310-4 may determine a data recognition model having a high relationship between input training data and basic training data, as a data recognition model to be trained In this case, the basic training data may be pre-classified for each type of data, and the data recognition model may be pre-established for each type of data. For example, the basic learning data may be pre-classified according to various standards such as an area where the learning data is generated, a time for which the learning data is generated, a size of the learning data, a genre of the learning data, a generator of the learning data, and a type of the object in the learning data The model trainer 1310-4 may train the data recognition model by using a training algorithm including, for example, error back-propagation or gradient descent.

The model trainer 1310-4 may train the data recognition model through supervised learning by using, for example, the training data as an input value. The model trainer 1310-4 may train the data recognition model through unsupervised learning to find a criterion for situation determination, by self-training a type of data necessary for situation determination without supervision, for example. The model trainer 1310-4 may train the data recognition model through reinforcement learning using a feedback about whether a result of the situation determination according to training is right, for example.

When the data recognition model is trained, the model trainer 1310-4 may store the trained data recognition model. In this case, the model trainer 1310-4 may store the trained data recognition model in a memory of an electronic device including the data recognizer 1320. Alternatively, the model trainer 1310-4 may store the trained data recognition model in a memory of a server that is connected with the electronic device via a wired or wireless network.

In this case, the memory that stores the trained data recognition model may also store, for example, a command or data related to at least one other component of the electronic device 1000. The memory may also store software and/or a program. The program may include, for example, a kernel, a middleware, an application programming interface (API), and/or an application program (or an application).

When the model evaluator 1310-5 inputs evaluation data to the data recognition model and a recognition result that is output from the evaluation data does not satisfy a predetermined criterion, the model evaluator 1310-5 may enable the model trainer 1310-4 to train again. In this case, the evaluation data may be preset data for evaluating the data recognition model.

For example, when the number or percentage of pieces of evaluation data that provide inaccurate recognition results from among recognition results of the trained data recognition model with respect to the evaluation data exceeds a preset threshold, the model evaluator 1310-5 may evaluate that the predetermined criterion is not satisfied. For example, when the predetermined criterion is defined as 2% and the trained data recognition model outputs wrong recognition results for more than 20 pieces of evaluation data from among a total of 1000 pieces of evaluation data, the model evaluator 1310-5 may evaluate that the trained data recognition model is not appropriate.

When there are a plurality of trained data recognition models, the model evaluator 1310-5 may evaluate whether each of the plurality of trained data recognition models satisfies the predetermined criterion, and may determine, as a final data recognition model, a data recognition model that satisfies the predetermined criterion. In this case, when a plurality of models satisfy the predetermined criterion, the model evaluator 1310-5 may determine one or a predetermined number of models that are preset in a descending order of evaluation scores as final data recognition models.

At least one of the data obtainer 1310-1, the pre-processor 1310-2, the training data selector 1310-3, the model trainer 1310-4, or the model evaluator 1310-5 in the data trainer 1310 may be manufactured in the form of at least one hardware chip and may be mounted on an electronic device. For example, at least one of the data obtainer 1310-1, the pre-processor 1310-2, the training data selector 1310-3, the model trainer 1310-4, or the model evaluator 1310-5 may be manufactured in the form of a dedicated hardware chip for AI, or may be manufactured as a portion of an existing general-purpose processor (for example, a CPU or an AP) or a processor dedicated to graphics (for example, a GPU) and may be mounted on any of the aforementioned various electronic devices.

The data obtainer 1310-1, the pre-processor 1310-2, the training data selector 1310-3, the model trainer 1310-4, and the model evaluator 1310-5 may be all mounted on a single electronic device, or may be respectively mounted on independent electronic devices. For example, some of the data obtainer 1310-1, the pre-processor 1310-2, the training data selector 1310-3, the model trainer 1310-4, and the model evaluator 1310-5 may be included in an electronic device, and the others may be included in a server.

For example, at least one of the data obtainer 1310-1, the pre-processor 1310-2, the training data selector 1310-3, the model trainer 1310-4, or the model evaluator 1310-5 may be implemented as a software module. When at least one of the data obtainer 1310-1, the pre-processor 1310-2, the training data selector 1310-3, the model trainer 1310-4, or the model evaluator 1310-5 is implemented as a software module (or a program module including instructions), the software module may be stored in a non-transitory computer-readable recording medium. In this case, the at least one software module may be provided by an OS or by a certain application. Alternatively, some of the at least one software module may be provided by an OS and the others may be provided by a certain application.

Figure 13:
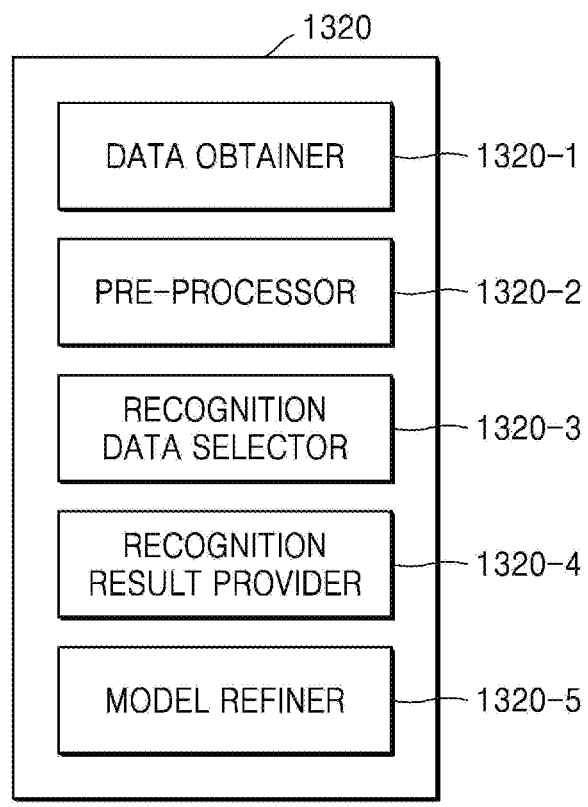
FIG. 13 is a block diagram of a data recognizer according to an embodiment of the disclosure.

FIG. 13 is a block diagram of the data recognizer 1320 according to an embodiment of the disclosure.

Referring to FIG. 13, the data recognizer 1320 may include a data obtainer 1320-1, a pre-processor 1320-2, a recognition data selector 1320-3, a recognition result provider 1320-4, and a model refiner 1320-5.

The data obtainer 1320-1 may obtain data necessary for situation determination, and the pre-processor 1320-2 may pre-process the obtained data such that the obtained data may be used for situation determination. The pre-processor 1320-2 may process the obtained data in a preset format such that the recognition result provider 1320-4, which will be described later, may use the obtained data for situation determination.

The data obtainer 1320-1 may provide obtained input data to the recognition result provider 1320-4.

The recognition data selector 1320-3 may select data necessary for situation determination from among the pre-processed data. The selected data may be provided to the recognition result provider 1320-4. The recognition data selector 1320-3 may select some or all of the pre-processed data, according to the preset criterion for situation determination. The recognition data selector 1320-3 may select data according to a criterion previously set due to training by the model trainer 1310-4, which will be described later.

The recognition result provider 1320-4 may determine a situation by applying the selected data to the data recognition model. The recognition result provider 1320-4 may provide a recognition result that conforms to a data recognition purpose. The recognition result provider 1320-4 may apply the selected data to the data recognition model by using the data selected by the recognition data selector 1320-3 as an input value. The recognition result may be determined by the data recognition model.

The recognition result provider 1320-4 may include a data recognition model including a neural network. The recognition result provider 1320-4 may include a data recognition model including a plurality of convolution layers and a neural network.

The recognition result provider 1320-4 may provide a recognition result of an input image, as an output image, by using the data recognition model.

The model refiner 1320-5 may enable the data recognition model to be refined, based on an evaluation of the recognition result provided by the recognition result provider 1320-4. For example, the model refiner 1320-5 may enable the model trainer 1310-4 to refine the data recognition model, by providing the recognition result provided by the recognition result provider 1320-4 to the model trainer 1310-4.

At least one of the data obtainer 1320-1, the pre-processor 1320-2, the recognition data selector 1320-3, the recognition result provider 1320-4, or the model refiner 1320-5 within the data recognizer 1320 may be manufactured in the form of at least one hardware chip and may be mounted on an electronic device. For example, at least one of the data obtainer 1320-1, the pre-processor 1320-2, the recognition data selector 1320-3, the recognition result provider 1320-4, or the model refiner 1320-5 may be manufactured in the form of a dedicated hardware chip for AI, or may be manufactured as a portion of an existing general-purpose processor (for example, a CPU or an AP) or a processor dedicated to graphics (for example, a GPU) and may be mounted on any of the aforementioned various electronic devices.

The data obtainer 1320-1, the pre-processor 1320-2, the recognition data selector 1320-3, the recognition result provider 1320-4, and the model refiner 1320-5 may be all mounted on a single electronic device, or may be respectively mounted on independent electronic devices. For example, some of the data obtainer 1320-1, the pre-processor 1320-2, the recognition data selector 1320-3, the recognition result provider 1320-4, and the model refiner 1320-5 may be included in an electronic device, and the others may be included in a server.

At least one of the data obtainer 1320-1, the pre-processor 1320-2, the recognition data selector 1320-3, the recognition result provider 1320-4, or the model refiner 1320-5 may be implemented as a software module. When at least one of the data obtainer 1320-1, the pre-processor 1320-2, the recognition data selector 1320-3, the recognition result provider 1320-4, or the model refiner 1320-5 is implemented as a software module (or a program module including instructions), the software module may be stored in a non-transitory computer-readable recording medium. In this case, the at least one software module may be provided by an OS or by a certain application. Alternatively, some of the at least one software module may be provided by an OS and the others may be provided by a certain application.

Figure 14:
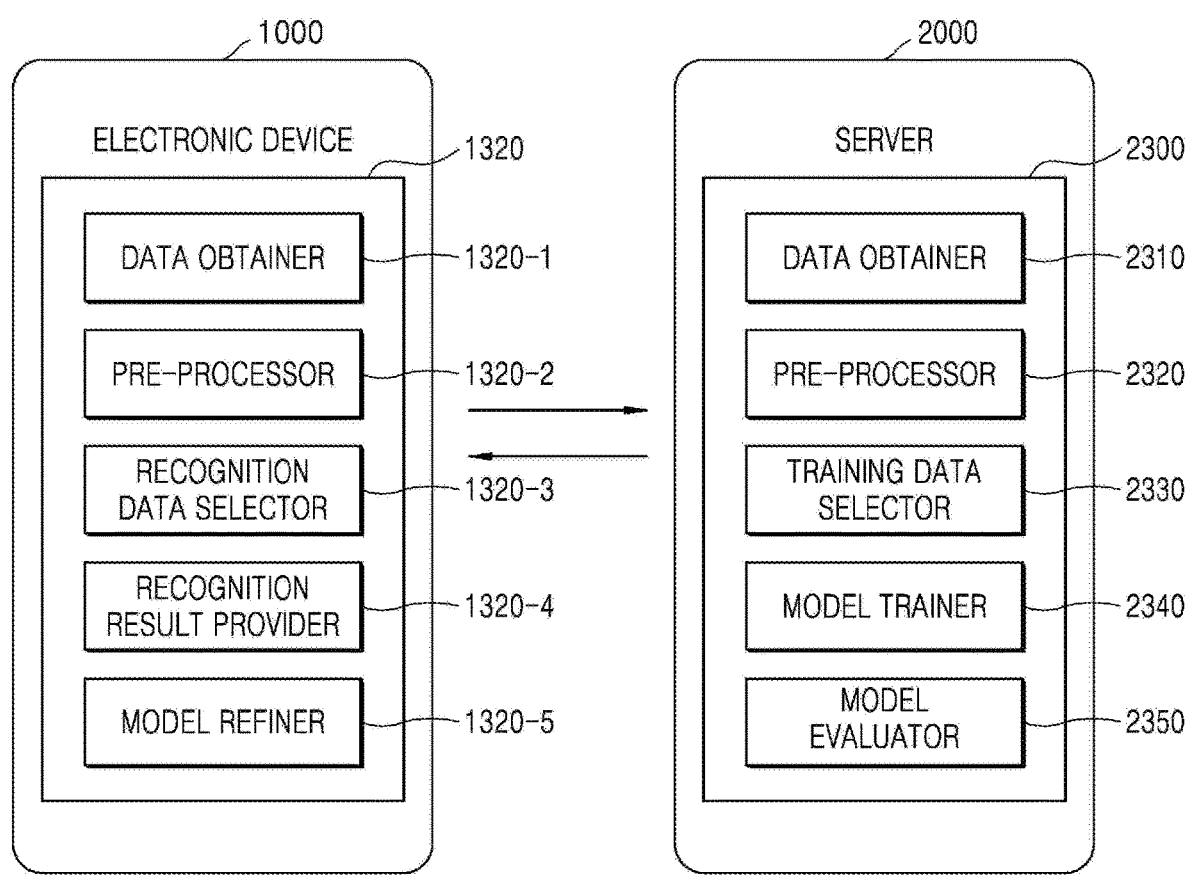
FIG. 14 is a block diagram illustrating an example where an electronic device and a server interoperate to train and recognize data, according to an embodiment of the disclosure.

FIG. 14 is a block diagram illustrating an example where the electronic device 1000 and a server 2000 interoperate to train and recognize data, according to an embodiment of the disclosure.

Referring to FIG. 14, the server 2000 may train an algorithm for obtaining output data, and the electronic device 1000 may obtain output data, based on a result of the training performed by the server 2000.

In this case, a model trainer 2340 of the server 2000 may perform a function of the data trainer 1310 of FIG. 12. The model trainer 2340 of the server 2000 may train a criterion regarding what data is used to determine a certain situation and a criterion regarding how to obtain output data by using data. The model trainer 2340 may obtain data that is to be used in training, and may apply the obtained data to a data recognition model which will be described later, thereby training the criterion for situation determination and the criterion for obtaining the output data.

The recognition result provider 1320-4 of the electronic device 1000 may apply the data selected by the recognition data selector 1320-3 to a data recognition model generated by the server 2000, thereby obtaining the output data. For example, the recognition result provider 1320-4 may transmit the data selected by the recognition data selector 1320-3 to the server 2000, and the server 2000 may request obtainment of the output data by applying the data selected by the recognition data selector 1320-3 to a data recognition model. The recognition result provider 1320-4 may receive information about the output data obtained by the server 2000 from the server 2000.

Alternatively, the recognition result provider 1320-4 of the electronic device 1000 may receive the data recognition model generated by the server 2000 from the server 2000, and may determine a situation by using the received data recognition model. In this case, the recognition result provider 1320-4 of the electronic device 1000 may obtain the output data by applying the data selected by the recognition data selector 1320-3 to the data recognition model received from the server 2000.

Figure 15:
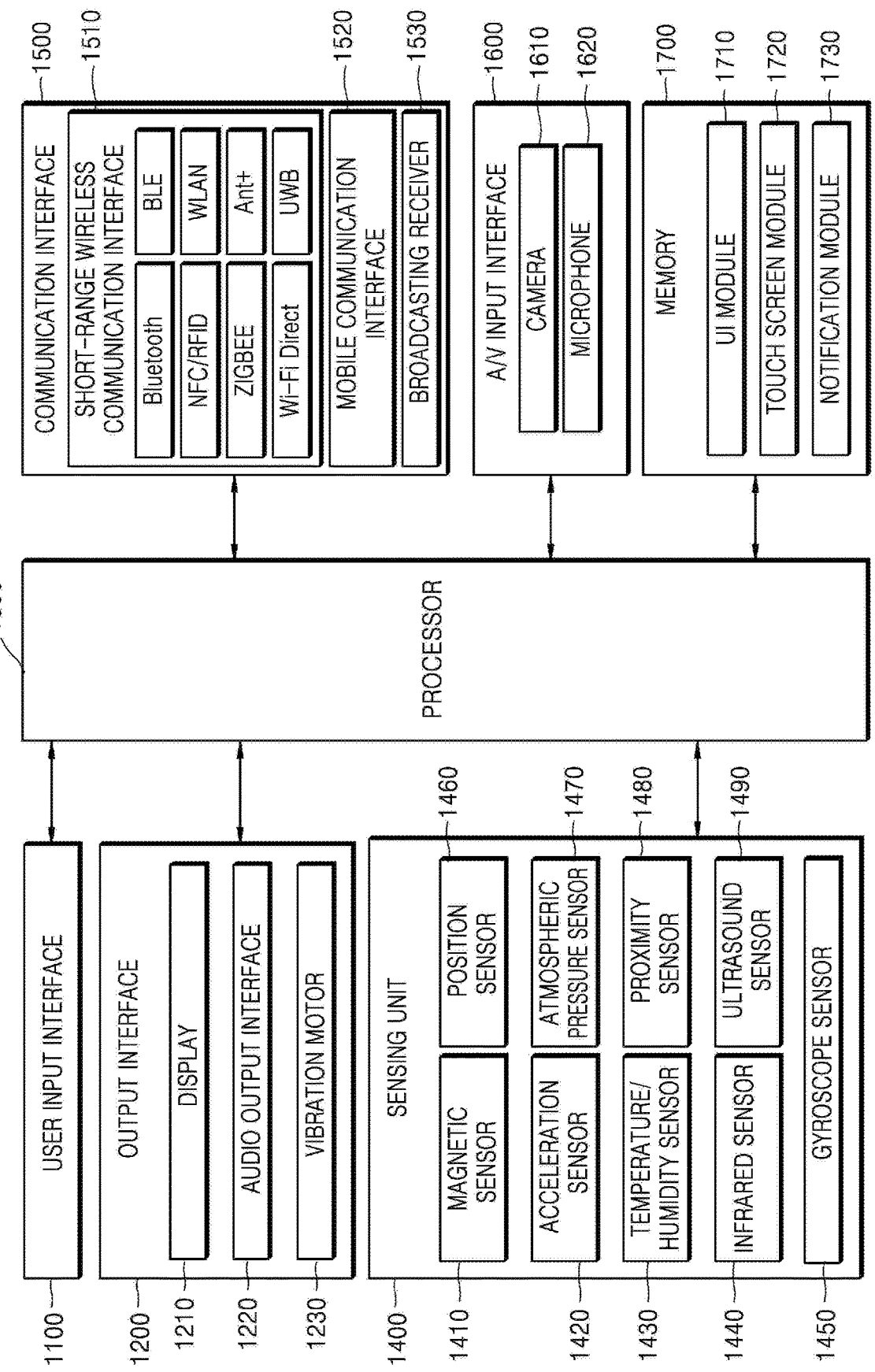
FIG. 15 is a block diagram of a structure of an electronic device according to another embodiment of the disclosure.

FIG. 15 is a block diagram of a structure of the electronic device 1000 according to another embodiment of the disclosure.

For example, referring to FIG. 15, the electronic device 1000 may include a user input interface 1100, an output interface 1200, a processor 1300, a sensing unit 1400, a communication interface 1500, an audio/video (A/V) input interface 1600, and a memory 1700.

The memory 1700, the processor 1300, and a display 1210 may correspond to the memory 210, the processor 220, and the display 230 of FIG. 10, and thus redundant descriptions thereof will be omitted herein.

The user input interface 1100 denotes a unit via which a user inputs data for controlling the electronic device 1000. For example, the user input interface 1100 may be, but is not limited to, a key pad, a dome switch, a touch pad (e.g., a capacitive overlay type, a resistive overlay type, an infrared beam type, an integral strain gauge type, a surface acoustic wave type, a piezo electric type, or the like), a jog wheel, or a jog switch.

The output interface 1200 may output an audio signal, a video signal, or a vibration signal, and may include the display 1210, an audio output interface 1220, and a vibration motor 1230.

The display 1210 displays information that is processed by the electronic device 1000. For example, the display 1210 may output a preview image received via a camera 1610.

The audio output interface 1220 outputs audio data that is received from the communication interface 1500 or stored in the memory 1700. The audio output interface 1220 also outputs an audio signal (for example, a call signal receiving sound, a message receiving sound, or a notification sound) related with a function of the electronic device 1000. The audio output interface 1220 may include, for example, a speaker and a buzzer.

The vibration motor 1230 may output a vibration signal. For example, the vibration motor 1230 may output a vibration signal corresponding to an output of audio data or video data (for example, a call signal receiving sound or a message receiving sound). The vibration motor 1230 may also output a vibration signal when a touch screen is touched.

The processor 1300 typically controls all operations of the electronic device 1000. For example, the processor 1300 may control the user input interface 1100, the output interface 1200, the sensing unit 1400, the communication interface 1500, the A/V input interface 1600, and the like by executing programs stored in the memory 1700. The processor 1300 may enable the electronic device 1000 to generate output data, by controlling the user input interface 1100, the output interface 1200, the sensing unit 1400, the communication interface 1500, and the A/V input interface 1600.

The sensing unit 1400 may sense a state of the electronic device 1000 or a state of the surrounding of the electronic device 1000 and may transmit information corresponding to the sensed state to the processor 1300.

The sensing unit 1400 may include, but is not limited thereto, at least one of a magnetic sensor 1410, an acceleration sensor 1420, a temperature/humidity sensor 1430, an infrared sensor 1440, a gyroscope sensor 1450, a position sensor (e.g., a global positioning system (GPS)) 1460, an atmospheric pressure sensor 1470, a proximity sensor 1480, or an ultrasound sensor 1490. Functions of most of the sensors would be instinctively understood by one of ordinary skill in the art in view of their names and thus detailed descriptions thereof will be omitted herein.

The communication interface 1500 may include one or more components that enable communication between the electronic device 1000 and another device or between the electronic device 1000 and the server 2000. For example, the communication interface 1500 may include a short-range wireless communication interface 1510, a mobile communication interface 1520, and a broadcasting receiver 1530.

Examples of the short-range wireless communication interface 1510 may include, but are not limited to, a Bluetooth communication interface, a Bluetooth Low Energy (BLE) communication interface, a near field communication (NFC) interface, a wireless local area network (WLAN) (e.g., Wi-Fi) communication interface, a ZigBee communication interface, an infrared Data Association (IrDA) communication interface, a Wi-Fi direct (WFD) communication interface, an ultra wideband (UWB) communication interface, and an Ant+ communication interface.

The mobile communication interface 1520 may exchange a wireless signal with at least one selected from a base station, an external terminal, and a server on a mobile communication network. Here, examples of the wireless signal may include a voice call signal, a video call signal, and various types of data according to text/multimedia messages transmission.

The broadcasting receiver 1530 receives a broadcasting signal and/or broadcasting-related information from an external source via a broadcasting channel. The broadcasting channel may be a satellite channel, a ground wave channel, or the like. According to embodiments of the disclosure, the electronic device 1000 may not include the broadcasting receiver 1530.

The A/V input interface 1600 inputs an audio signal or a video signal, and may include the camera 1610 and a microphone 1620. The camera 1610 may acquire an image frame, such as a still image or a moving picture, via an image sensor in a video call mode or a photography mode. An image captured via the image sensor may be processed by the processor 1300 or a separate image processor (not shown).

The image frame obtained by the camera 1610 may be stored in the memory 1700 or transmitted to the outside via the communication interface 1500. At least two cameras 1610 may be included according to embodiments of the structure of a terminal.

The microphone 1620 receives an external audio signal and converts the external audio signal into electrical audio data. For example, the microphone 1620 may receive an audio signal from an external device or a user. The microphone 1620 may receive a voice input of the user. The microphone 1620 may use various noise removal algorithms in order to remove noise that is generated while receiving the external audio signal.

The memory 1700 may include at least one type of storage medium selected from among a flash memory type, a hard disk type, a multimedia card micro type, a card type memory (for example, a secure digital (SD) or extreme digital (XD) memory), a random access memory (RAM), a static random access memory (SRAM), a read-only memory (ROM), an electrically erasable programmable ROM (EEPROM), a programmable ROM (PROM), magnetic memory, a magnetic disk, and an optical disk. The electronic device 1000 may operate a web storage or a cloud server on the internet which performs a storage function of the memory 1700.

The programs stored in the memory 1700 may be classified into a plurality of modules according to their functions, for example, a user interface (UI) module 1710, a touch screen module 1720, and a notification module 1730.

The UI module 1710 may provide a UI, a graphical user interface (GUI), or the like that is specialized for each application and interoperates with the electronic device 1000. The touch screen module 1720 may detect a touch gesture on a touch screen of a user and transmit information regarding the touch gesture to the processor 1300. The touch screen module 1720 according to an embodiment of the disclosure may recognize and analyze a touch code. The touch screen module 1720 may be configured by separate hardware including a controller.

The notification module 1730 may generate a signal for notifying that an event has been generated in the electronic device 1000. Examples of the event generated in the electronic device 1000 may include call signal receiving, message receiving, a key signal input, schedule notification, and the like. The notification module 1730 may output a notification signal in the form of a video signal via the display 1210, in the form of an audio signal via the audio output interface 1220, or in the form of a vibration signal via the vibration motor 1230.

A controlling method according to an embodiment of the disclosure may be embodied as program commands executable by various computer means and may be recorded on a computer-readable recording medium. The computer-readable recording medium may include program commands, data files, data structures, and the like separately or in combinations. The program commands to be recorded on the computer-readable recording medium may be specially designed and configured for embodiments of the disclosure or may be well-known to and be usable by one of ordinary skill in the art of computer software. Examples of the computer-readable recording medium include a magnetic medium such as a hard disk, a floppy disk, or a magnetic tape, an optical medium such as a compact disk-read-only memory (CD-ROM) or a digital versatile disk (DVD), a magneto-optical medium such as a floptical disk, and a hardware device specially configured to store and execute program commands such as a ROM, a random-access memory (RAM), or a flash memory. Examples of the program commands are advanced language codes that can be executed by a computer by using an interpreter or the like as well as machine language codes made by a compiler.

Any of the functions of the disclosure described herein, in some embodiments, may be implemented by a program including instructions. The program may be stored in a memory, such as memory 210. The instructions may be read from the memory and executed by one or more processors, such as processor 220.

While the disclosure and advantages have been particularly shown and described with reference to embodiments thereof, it will be understood by those of skill in the art that various changes in form and details may be made therein without departing from the spirit and scope of the disclosure as defined by the appended claims. The embodiments and the drawings of the disclosure should be considered in descriptive sense only and not for purposes of limitation. All differences within the scope will be construed as being included in the disclosure.

What is claimed is:

1. A computing apparatus using a convolutional neural network (CNN) including a plurality of convolution layers for image processing, the computing apparatus comprising:
   a memory storing one or more instructions; and
   one or more processors configured to execute the one or more instructions stored in the memory to:
   obtain input data of an image;
   identify a filter for performing, on one of the plurality of convolution layers, a convolution operation with respect to the input data;
   identify a plurality of sub-filters within the filter, the plurality of sub-filters associated with a plurality of filtering regions, wherein each of the plurality of filtering regions is associated with at least one of the plurality of sub-filters;
   provide a plurality of feature maps based on the plurality of sub-filters; and
   obtain output data based on the plurality of feature maps, wherein the output data comprises image data corresponding to the input data;
   wherein the one or more processors are further configured to execute the one or more instructions to identify the plurality of sub-filters by:
   identifying a first filtering region and a second filtering region, the second filtering region being different from the first filtering region; and
   identifying a selected filter associated with the first filtering region and associated with the second filtering region as one of the plurality of sub-filters,
   wherein the input data comprises three-dimensional (3D) matrix data having a size of a×b×n, wherein a, b, and n are natural numbers, and
   wherein the first filtering region and the second filtering region are applied for different channels among n channels, and the channels correspond to depth of the input data.

2. The computing apparatus of claim 1, wherein the one or more processors are further configured to execute the one or more instructions to provide the plurality of feature maps by:

providing a first feature map by performing a first convolution operation with respect to the input data by using a first filter associated with the first filtering region;

providing a second feature map by performing a second convolution operation with respect to the input data by using a second filter associated with the second filtering region; and providing a third feature map of the plurality of feature maps by performing summation with respect to the first and second feature maps.

3. The computing apparatus of claim 1, wherein the one or more processors are further configured to execute the one or more instructions to identify the plurality of sub-filters by:

identifying the first filtering region of a predetermined size associated with the filter; and identifying the plurality of filtering regions by shifting an association of the first filtering region in each of a first direction and a second direction with respect to the filter.

4. The computing apparatus of claim 1, wherein the one or more processors are further configured to execute the one or more instructions to provide the plurality of feature maps by:

identifying, as one of the plurality of feature maps, a first feature map provided by performing a first convolution operation with respect to the input data, by using a first filter associated with the first filtering region;

providing a second feature map by shifting the first feature map in a first direction; and providing a third feature map by shifting the first feature map in a second direction.

5. The computing apparatus of claim 1, wherein the input data corresponds to a group of a plurality of pieces of two-dimensional (2D) matrix data, and the plurality of sub-filters are applied to a plurality of pieces of 2D matrix data, and the plurality of sub-filters are associated with different 2D filtering regions.

6. The computing apparatus of claim 1, wherein the one or more processors are further configured to execute the one or more instructions to train the plurality of sub-filters using predetermined input data and predetermined output data.

7. The computing apparatus of claim 6, wherein the one or more processors are further configured to execute the one or more instructions to train a first sub-filter of the plurality of sub-filters by identifying a weight of the first sub-filter and identifying a filtering region associated the first sub-filter.

8. A method of operating a convolutional neural network (CNN) including a plurality of convolution layers for image processing, the method comprising:

obtaining input data of an image;

identifying a filter for performing, on one of the plurality of convolution layers, a convolution operation with respect to the input data;

identifying a plurality of sub-filters within the filter, the plurality of sub-filters associated with a plurality of filtering regions, wherein each of the plurality of filtering regions is associated with at least one of the plurality of sub-filters;

providing a plurality of feature maps based on the plurality of sub-filters; and obtaining output data based on the plurality of feature maps, wherein the output data comprises image data corresponding to the input data, wherein the identifying of the plurality of sub-filters comprises:

identifying a first filtering region and a second filtering region, the second filtering region being different from the first filtering region; and identifying a selected filter associated with the first filtering region and associated with the second filtering region as one of the plurality of sub-filters, wherein the input data comprises three-dimensional (3D) matrix data having a size of a×b×n, wherein a, b, and n are natural numbers, and wherein the first filtering region and the second filtering region are applied for different channels among n channels, and the channels correspond to depth of the input data.

9. The method of claim 8, wherein the providing the plurality of feature maps further comprises:

providing a first feature map by performing a first convolution operation with respect to the input data by using a first filter associated with the first filtering region;

providing a second feature map by performing a second convolution operation with respect to the input data by using a second filter associated with the second filtering region; and providing a third feature map of the plurality of feature maps by performing summation with respect to the first and second feature maps.

10. The method of claim 8, wherein the identifying of the plurality of sub-filters comprises:

identifying the first filtering region of a predetermined size associated with the filter; and identifying the plurality of filtering regions by shifting an association of the first filtering region in each of a first direction and a second direction with respect to the filter.

11. The method of claim 10, wherein the providing the plurality of feature maps further comprises:

identifying, as one of the plurality of feature maps, a first feature map provided by performing a first convolution operation with respect to the input data, by using a first filter associated the first filtering region;

providing a second feature map by shifting the first feature map in the first direction; and providing a third feature map by shifting the first feature map in the second direction.

12. The method of claim 8, wherein the input data corresponds to a group of a plurality of pieces of two-dimensional (2D) matrix data, and the plurality of sub-filters are applied to a plurality of pieces of 2D matrix data, and the plurality of sub-filters are associated with different 2D filtering regions.

13. The method of claim 8, further comprising training the plurality of sub-filters by using predetermined input data and predetermined output data.

14. The method of claim 13, wherein a training of a first sub-filter of the plurality of sub-filters comprises identifying a weight of the first sub-filter and identifying a filtering region associated with the first sub-filter.

15. A computer program product comprising one or more non-transitory computer-readable storage media having stored thereon a program, which, when executed by a computer, performs an operations comprising:

obtaining input data;

identifying a filter for performing, on one of a plurality of convolution layers, a convolution operation with respect to the input data;

identifying a plurality of sub-filters within the filter, the plurality of sub-filters associated with a plurality of filtering regions, wherein each of the plurality of filtering regions is associated with at least one of the plurality of sub-filters;
providing a plurality of feature maps based on the plurality of sub-filters; and
obtaining output data based on the plurality of feature maps, wherein the output data comprises image data corresponding to the input data,
wherein the identifying of the plurality of sub-filters comprises:
   identifying a first filtering region and a second filtering region, the second filtering region being different from the first filtering region; and
   identifying a selected filter associated with the first filtering region and associated with the second filtering region as one of the plurality of sub-filters,
wherein the input data comprises three-dimensional (3D) matrix data having a size of a×b×n, wherein a, b, and n are natural numbers, and
wherein the first filtering region and the second filtering region are applied for different channels among n channels, and the channels correspond to depth of the input data.

\* \* \* \* \*